(12) United States Patent
Kwon et al.

(10) Patent No.: US 11,301,061 B2
(45) Date of Patent: Apr. 12, 2022

(54) ELECTRONIC DEVICE IDENTIFYING GESTURE WITH STYLUS PEN AND METHOD FOR OPERATING THE SAME

(71) Applicant: SAMSUNG ELECTRONICS CO., LTD., Suwon-si (KR)

(72) Inventors: Banghyun Kwon, Suwon-si (KR); Inhyung Jung, Suwon-si (KR); Hyunwoong Kwon, Suwon-si (KR); Sangmin Shin, Suwon-si (KR); Sangheon Kim, Suwon-si (KR); Jongwu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/940,939

(22) Filed: Jul. 28, 2020

(65) Prior Publication Data
US 2021/0034174 A1   Feb. 4, 2021

(30) Foreign Application Priority Data
Jul. 30, 2019   (KR) .......................... 10-2019-0092427

(51) Int. Cl.
*G06F 3/0354*   (2013.01)
*G06F 3/041*   (2006.01)
*G06F 3/01*   (2006.01)

(52) U.S. Cl.
CPC .......... *G06F 3/03545* (2013.01); *G06F 3/017* (2013.01); *G06F 3/04162* (2019.05); *G06F 2203/04101* (2013.01)

(58) Field of Classification Search
CPC .. G06F 3/03545; G06F 3/04162; G06F 3/017; G06F 2203/04101; G06F 3/014;
(Continued)

(56) References Cited

U.S. PATENT DOCUMENTS 5,148,155 A * 9/1992 Martin .................... G06F 3/038
178/18.03
2002/0067350 A1 * 6/2002 Ben Ayed .......... G06K 9/00335
345/179
(Continued)

FOREIGN PATENT DOCUMENTS

EP   2 701 056   2/2014
KR   10-2014-0096752   8/2014
(Continued)

OTHER PUBLICATIONS

International Search Report and Written Opinion dated Oct. 26, 2020 in counterpart International Patent Application No. PCT/KR2020/009891.
(Continued)

*Primary Examiner* — Temesghen Ghebretinsae
*Assistant Examiner* — Ivelisse Martinez Quiles
(74) *Attorney, Agent, or Firm* — Nixon & Vanderhye P.C.

(57) ABSTRACT

According to an embodiment, an electronic device comprises: a communication module comprising communication circuitry, a processor electrically connected with the communication module, and a memory electrically connected with the processor, wherein the memory stores instructions which, when executed by the processor, cause the processor to control the electronic device to: receive at least one first communication signal including information about a position of a stylus pen through the communication module, identify a gesture based on the information about the position of the stylus pen, identify an operation corresponding to the gesture, and based on detecting a repetition event for the operation based on at least one second communication signal received from the stylus pen, through the communication module, repeat an execution of the operation.

16 Claims, 22 Drawing Sheets

(58) Field of Classification Search
CPC .... G06F 3/0488; G06F 3/04883; G06F 3/038; G06K 9/00355; G06K 9/00496
See application file for complete search history.

(56) References Cited

U.S. PATENT DOCUMENTS

| | | | |
|---|---|---|---|
| 2004/0047505 A1* | 3/2004 | Ghassabian | G06K 9/00 382/186 |
| 2013/0050141 A1* | 2/2013 | Park | G06F 3/044 345/174 |
| 2014/0055427 A1* | 2/2014 | Kim | G06F 3/0488 345/179 |
| 2014/0059428 A1* | 2/2014 | Jeong | G06F 3/017 715/708 |
| 2014/0210744 A1* | 7/2014 | Song | G06F 3/03545 345/173 |
| 2014/0218343 A1* | 8/2014 | Hicks | G06F 3/03545 345/179 |
| 2014/0253520 A1* | 9/2014 | Cueto | G06F 3/03545 345/179 |
| 2015/0220168 A1 | 8/2015 | Keating et al. | |
| 2015/0234528 A1* | 8/2015 | Choi | G06F 3/0383 715/716 |
| 2015/0301609 A1 | 10/2015 | Park et al. | |
| 2016/0266663 A1* | 9/2016 | Holsen | G06F 3/0416 |
| 2016/0368141 A1 | 12/2016 | Touma et al. | |
| 2017/0322642 A1* | 11/2017 | Zhang | G06F 1/1626 |
| 2017/0322665 A1 | 11/2017 | Shim et al. | |
| 2018/0004309 A1 | 1/2018 | Kinrot et al. | |
| 2018/0081455 A1* | 3/2018 | Huston | G06F 3/0383 |
| 2021/0034188 A1* | 2/2021 | Kwon | G06F 3/0383 |

FOREIGN PATENT DOCUMENTS

| | | |
|---|---|---|
| KR | 10-2015-0121949 | 10/2015 |
| KR | 10-2016-0007612 | 1/2016 |
| KR | 10-2017-0126294 | 11/2017 |
| WO | 03/058394 | 7/2003 |

OTHER PUBLICATIONS

Extended Search Report and Written Opinion dated Dec. 23, 2020 in counterpart European Patent Application No. 20188180.2.

* cited by examiner

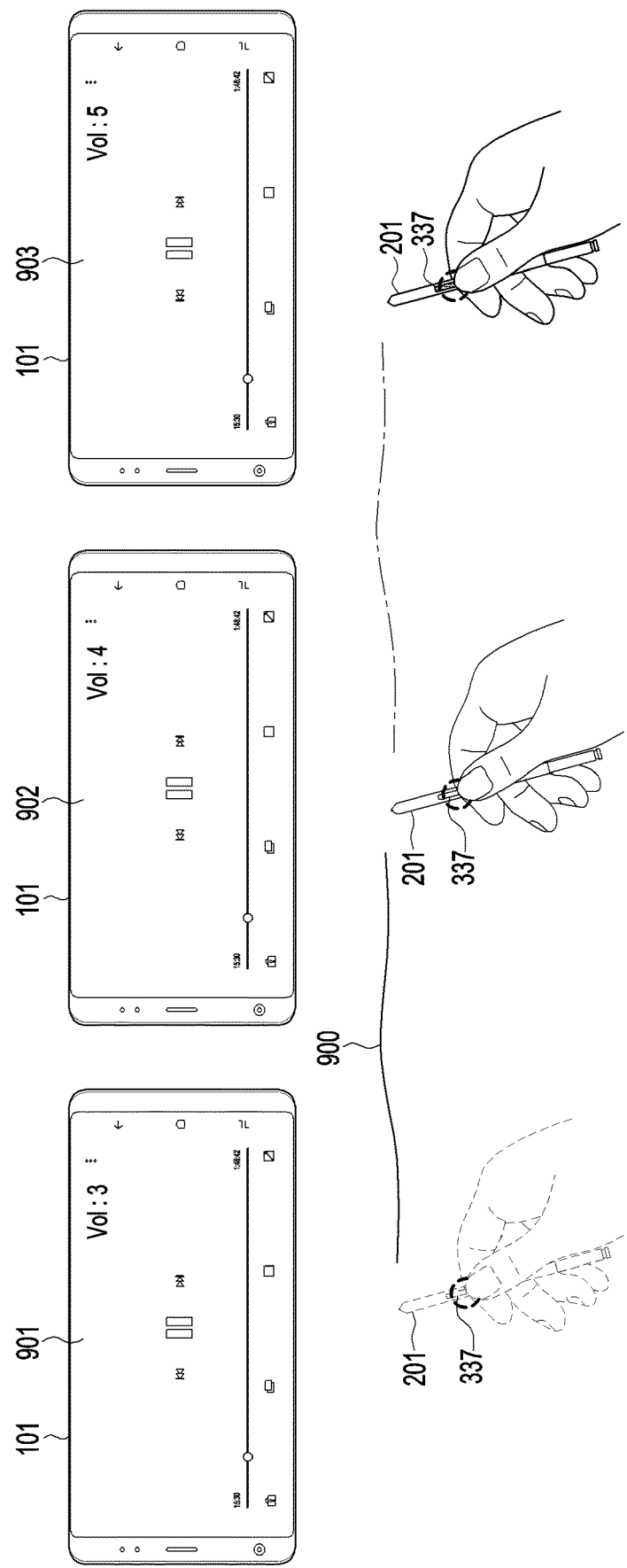

ELECTRONIC DEVICE IDENTIFYING GESTURE WITH STYLUS PEN AND METHOD FOR OPERATING THE SAME

CROSS-REFERENCE TO RELATED APPLICATION

This application is based on and claims priority under 35 U.S.C. § 119 to Korean Patent Application No. 10-2019-0092427, filed on Jul. 30, 2019, in the Korean Intellectual Property Office, the disclosure of which is incorporated by reference herein in its entirety.

BACKGROUND

Field

The disclosure relates to an electronic device identifying a gesture with a stylus pen and a method for operating the electronic device.

Description of Related Art

Electronic devices are being developed to be able to receive various inputs from the user through a specified input device (e.g., a stylus pen) connected with the electronic device via wireless communication. An electronic device may identify a designated position on an electronic device with a pen input device (which may be referred to herein as a stylus pen for ease of description) and perform its corresponding function.

The electronic device may detect magnetic fields produced from the stylus pen using electro magnetic resonance (EMR). An electronic device may identify the position of a stylus pen based on an electromotive force generated by a magnetic field per channel.

The stylus pen may be connected with the electronic device via short-range communication (e.g., Bluetooth low energy (BLE)). The stylus pen may transmit information about a pressing state of a button on the housing of the stylus pen to the electronic device via short-range communication, and the electronic device may perform a designated operation based on the received information.

The electronic device may perform the designated operation depending on whether the stylus pen button is pressed. However, only a few electronic device operations may be matched to the on/off of the stylus pen button. An application supporting various operations based on a stylus pen may be difficult to effectively control. For repeating a certain operation, the user may be required to repeat manipulation of the stylus pen.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device and method for operating the same that identify a gesture with a stylus pen based on information included in a communication signal received from the stylus pen and repeat an operation corresponding to the identified gesture.

According to various example embodiments, an electronic device comprises: a communication module comprising communication circuitry, a processor electrically connected with the communication module, and a memory electrically connected with the processor, wherein the memory stores instructions that, when executed by the processor, cause the processor to control the electronic device to: receive at least one first communication signal including information about a position of a stylus pen through the communication module, identify a gesture based on the information about the position of the stylus pen, identify an operation corresponding to the gesture, and based on detecting a repetition event for the operation based on at least one second communication signal received from the stylus pen through the communication module, repeat an execution of the operation.

According to various example embodiments, an electronic device comprises: a panel, a communication module comprising communication circuitry, a processor electrically connected with the panel and the communication module, and a memory electrically connected with the processor, wherein the memory stores instructions that, when executed by the processor, cause the processor to control the electronic device to: based on a pen signal from a stylus pen through the panel being detected, execute a first operation based on the pen signal, and based on the pen signal from the stylus pen through the panel not being detected, identify a gesture using information about a position of the stylus pen included in at least one first communication signal received through the communication module, identify a second operation corresponding to the gesture, and based on detecting a repetition event for the second operation, repeat an execution of the second operation.

According to various example embodiments, a method of operating an electronic device comprises: receiving at least one first communication signal including information about a position of a stylus pen, identifying a gesture based on the information about the position of the stylus pen, identifying an operation corresponding to the gesture, and based on detecting a repetition event for the operation based on at least one second communication signal received from the stylus pen, repeating an execution of the operation.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9A is a diagram illustrating an example of repeating an execution of an operation according to an embodiment;

Throughout the drawings, like reference numerals will be understood to refer to like parts, components, and structures.

DETAILED DESCRIPTION

Figure 1:
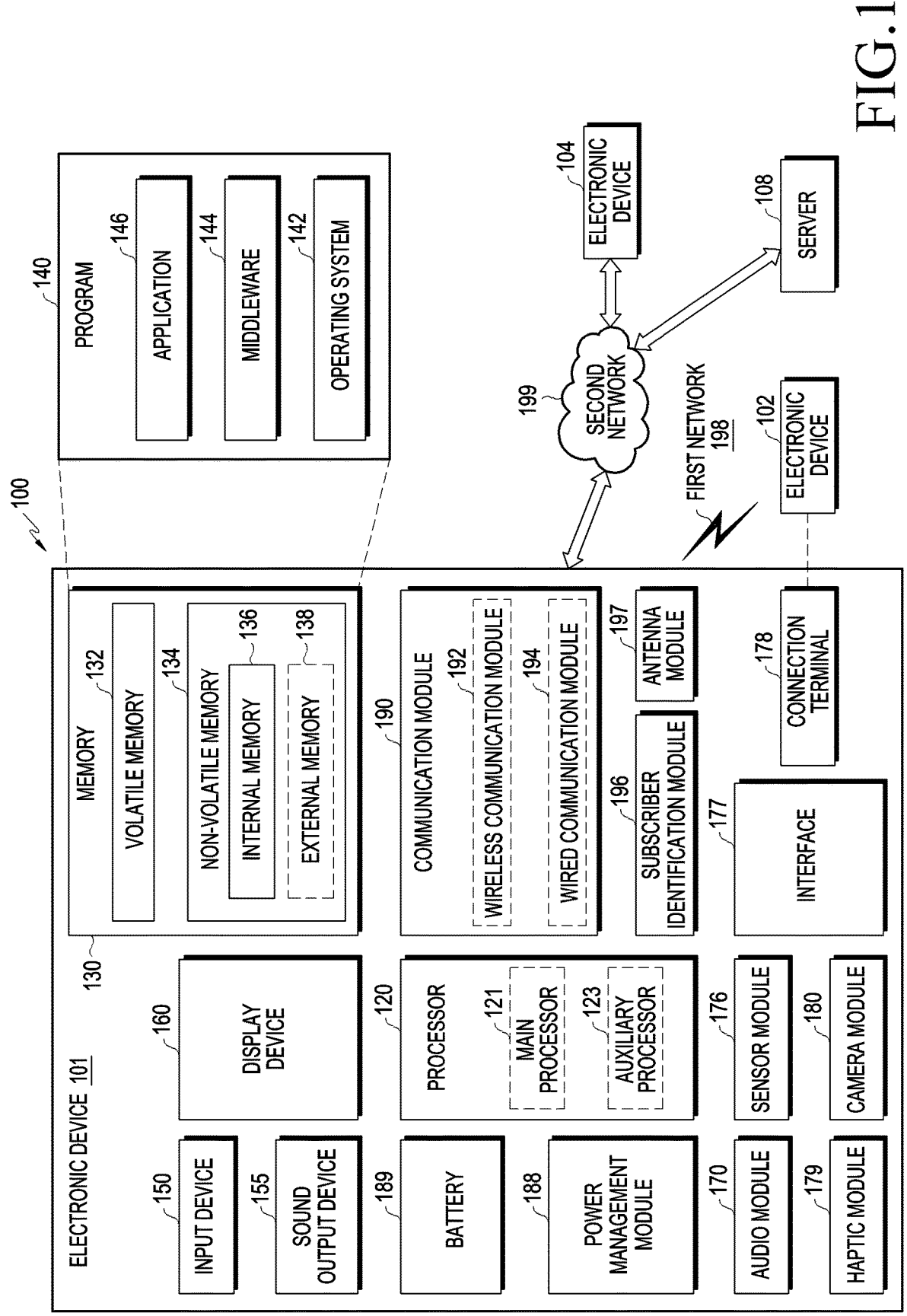
FIG. 1 is a diagram illustrating an example electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
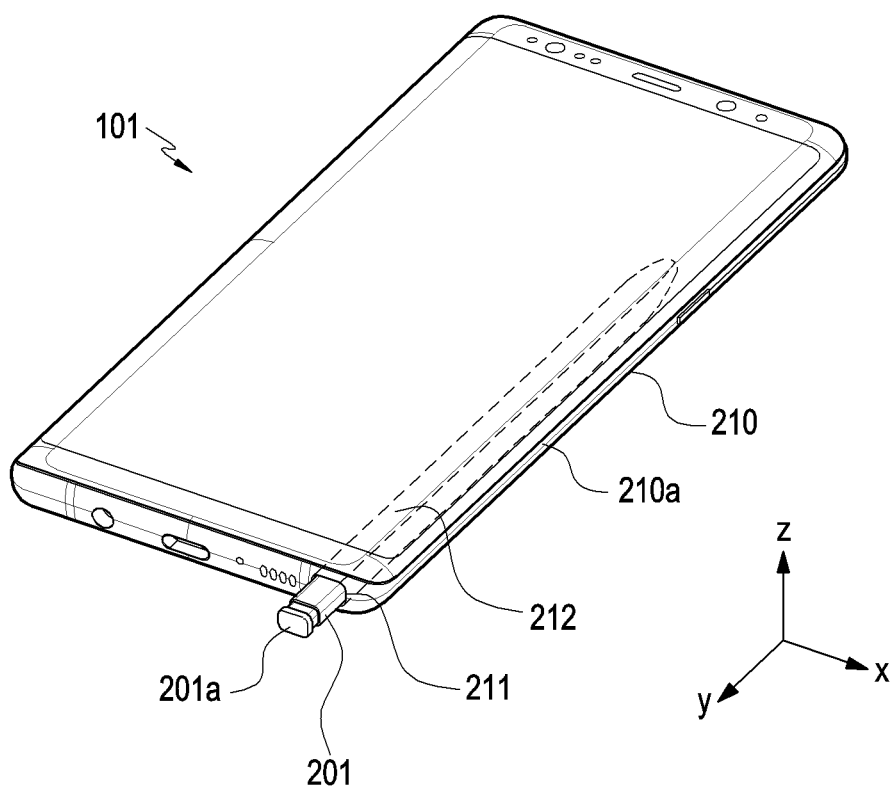
FIG. 2 is a front perspective view illustrating an example electronic device including a stylus pen according to an embodiment.

FIG. 2 is a front perspective view illustrating an example electronic device 101 including a stylus pen 201 (e.g., the electronic device 102 of FIG. 1) according to an embodiment. According to an embodiment, the stylus pen 201 may correspond to the input device 150 of FIG. 1 or the electronic device 102 of FIG. 1.

Referring to FIG. 2, according to an embodiment, the electronic device 101 may include the configuration shown in FIG. 1 and may include a structure where the stylus pen 201 may be inserted. The electronic device 101 may include a housing 210, and a hole 211 may be formed in a portion of the housing 210, e.g., a portion of a side surface 210a. The electronic device 101 may include a first inner space 212 which may include a storage space connected with the hole 211, and the stylus pen 201 may be inserted into the first inner space 212. In the example embodiment shown, the stylus pen 201 may have a pressable first button 201a at an end thereof to be easily pulled out of the first inner space 212 of the electronic device 101. When the first button 201a is pressed, a repulsive mechanism (e.g., at least one elastic member, e.g., a spring) configured in association with the first button 201a may be operated to allow the stylus pen 201 to be removed from the first inner space 212.

Figure 3A:
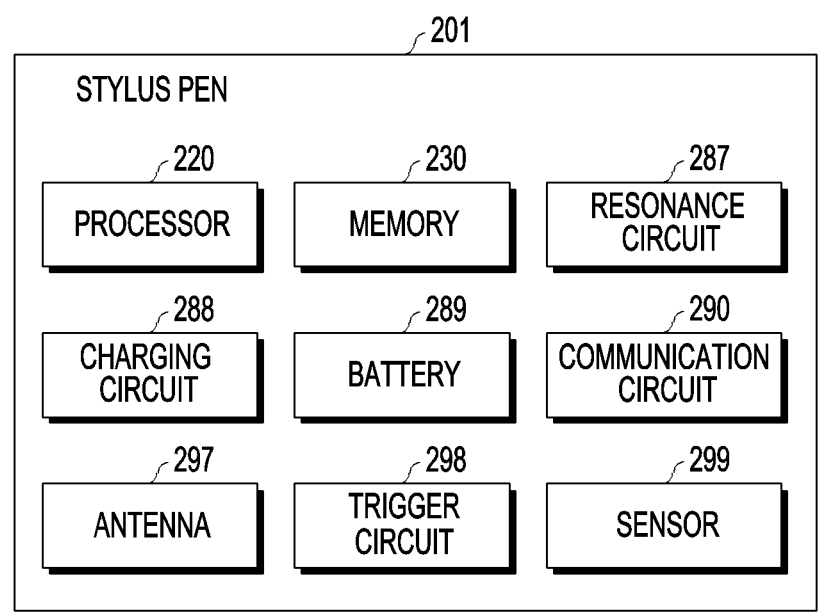
FIG. 3A is a block diagram illustrating an example stylus pen according to an embodiment.

FIG. 3A is a block diagram illustrating an example stylus pen (e.g., the stylus pen 201 of FIG. 2) according to an embodiment.

Referring to FIG. 3A, according to an embodiment, the stylus pen 201 may include a processor (e.g., including processing circuitry) 220, a memory 230, a resonance circuit 287, a charging circuit 288, a battery 289, a communication circuit 290, an antenna 297, a trigger circuit 298, and/or a sensor 299. According to an embodiment, the processor 220, at least part of the resonance circuit 287, and/or at least part of the communication circuit 290 of the stylus pen 201 may be configured in the form of a chip or on a printed circuit board. The processor 220, the resonance circuit 287, and/or the communication circuit 290 may be electrically connected with the memory 230, the charging circuit 288, the battery 289, the antenna 297, the trigger circuit 298, and/or the sensor 299.

According to an embodiment, the processor 220 may include various processing circuitry, including, for example, and without limitation, a customized hardware module or a generic processor configured to execute software (e.g., an application program). The processor 220 may include a hardware component (function) and/or software element (program) including at least one of a communication module or a module to manage the state or environment of the stylus pen 201, an input/output interface, a data measuring module, and various sensors provided in the stylus pen 201. The processor 220 may include, e.g., a hardware module, a software module, a firmware module, or a combination of two or more thereof. According to an embodiment, the processor 220 may be configured to transmit, through the communication circuit 290 to the electronic device 101, information indicating a pressing state of a button (e.g., the button 337 of FIG. 3B), sensing information obtained by the sensor 299, and/or information (e.g., information associated with the position of the stylus pen 201) calculated (or determined) based on the sensing information.

According to an embodiment, the resonance circuit 287 may resonate based on an electromagnetic field signal generated from a digitizer (e.g., the display device 160) of the electronic device 101 and may radiate an electromagnetic resonance (EMR) input signal (or magnetic field) by the resonance. The electronic device 101 may identify the position of the stylus pen 201 over the electronic device 101 using the EMR input signal. For example, the electronic device 101 may identify the position of the stylus pen 201 based on the magnitude of the electromotive force (e.g., output current) generated by the EMR input signal at each of a plurality of channels (e.g., a plurality of loop coils) in the digitizer. Although the electronic device 101 and the stylus pen 201 are described as operated based on the EMR scheme, this is merely an example, and the disclosure is not limited thereto. For example, the electronic device 101 may generate an electrical field-based signal based on an electrically coupled resonance (ECR) scheme. The resonance circuit of the stylus pen 201 may be resonated by the electric field. The electronic device 101 may identify the electric potential at the plurality of channels (e.g., electrodes) by the resonance of the stylus pen 201 and may identify the position of the stylus pen 201 based on the electric potential. The stylus pen 201 may be implemented in an active electrostatic (AES) scheme, and it will be easily appreciated by one of ordinary skill in the art that it is not limited to a specific kind of implementation. Further, the electronic device 101 may detect the stylus pen 201 based on a variation in capacitance (self-capacitance or mutual capacitance) associated with at least one electrode of the touch panel. In this example, the stylus pen 201 may not include the resonance circuit.

According to an embodiment, the memory 230 may store information related to the operation of the stylus pen 201. For example, the information may include information for communicating with the electronic device 101 and frequency information related to the input operation of the stylus pen 201. The memory 230 may store a program (or application, algorithm, or processing loop) for calculating (or determining) information (e.g., coordinate information and/or displacement information) about the position of the stylus pen 201 from the sensing data obtained by the sensor 299. The memory 230 may store the communication stack of the communication circuit 290. According to an implementation, the communication circuit 290 and/or processor 220 may include a dedicated memory.

According to an embodiment, the resonance circuit 287 may include a coil (or inductor) and/or capacitor. The resonance circuit 287 may be resonated based on an input electric field and/or magnetic field (e.g., an electric field and/or magnetic field generated from the digitizer of the electronic device 101). For example, when the stylus pen 201 transmits signals via the EMR scheme, the stylus pen 201 may generate a signal having a resonance frequency based on an electromagnetic field generated from the inductive panel of the electronic device 101. When the stylus pen 201 transmits signals via the AES scheme, the stylus pen 201 may generate a signal using a capacitive coupling with the electronic device 101. When the stylus pen 201 transmits signals via the ECR scheme, the stylus pen 201 may generate a signal having a resonance frequency based on an electric field generated from a capacitive device of the electronic device. According to an embodiment, the resonance circuit 287 may be used to vary the frequency or strength of electromagnetic field according to the user's manipulation state. For example, the resonance circuit 287 may provide various frequencies to recognize a hovering input, drawing input, button input, or erasing input. For example, the resonance circuit 287 may provide various resonance frequencies according to combinations of connections of a plurality of capacitors or based on a variable inductor and/or variable capacitor.

According to an embodiment, when connected with the resonance circuit 287 based on a switching circuit, the charging circuit 288 may, for example, rectify a resonance signal generated from the resonance circuit 287 into a direct current (DC) signal and provide the DC signal to the battery 289. According to an embodiment, the stylus pen 201 may identify whether the stylus pen 201 is inserted into the electronic device 101 using a voltage level of a DC signal sensed by the charging circuit 288. The stylus pen 201 may identify the pattern corresponding to the signal identified by the charging circuit 288, thereby identifying whether the stylus pen 201 has been inserted.

According to an embodiment, the battery 289 may be configured to store power required to operate the stylus pen 201. The battery 289 may include, e.g., a lithium-ion battery or a capacitor, or the like, and may be recharged or replaced. According to an embodiment, the battery 289 may be charged with power (e.g., DC signal (DC power)) received from the charging circuit 288.

According to an embodiment, the communication circuit 290 may be configured to perform wireless communication between the stylus pen 201 and the communication module 190 of the electronic device 101. According to an embodiment, the communication circuit 290 may transmit state information about the stylus pen 201, input information, and/or position-related information to the electronic device 101 using a short-range communication scheme. For example, the communication circuit 290 may transmit direction information (e.g., motion sensor data) about the stylus pen 201 obtained through the trigger circuit 298, voice information entered through the microphone, or remaining power information about the battery 289 to the electronic device 101. For example, the communication circuit 290 may transmit the sensing data obtained from the sensor 299 and/or information associated with the position of the stylus pen 201, identified based on the sensing data, to the electronic device 101. For example, the communication circuit 290 may transmit information about the state of a button (e.g., the button 337 of FIG. 3B) of the stylus pen 201 to the electronic device 101. As an example, the short-range communication scheme may include, but is not limited to, Bluetooth, Bluetooth low energy (BLE), near-field communication (NFC), wireless-fidelity (Wi-Fi) direct, or the like.

According to an embodiment, the antenna 297 may be used to transmit signals or power to the outside (e.g., the electronic device 101) or receive signals or power from the outside. According to an embodiment, the stylus pen 201 may include a plurality of antennas 297 and select at least one antenna 297 appropriate for the communication scheme from among the plurality of antennas. The communication circuit 290 may exchange signals or power with an external electronic device through the at least one selected antenna 297.

According to an embodiment, the trigger circuit 298 may include, for example, at least one button or sensor circuit. According to an embodiment, the processor 220 may identify the input scheme (e.g., touch or press) or kind (e.g., EMR button or BLE button) of the button of the stylus pen 201. According to an embodiment, the trigger circuit 298 may transmit a trigger signal to the electronic device 101 using, for example, and without limitation, a signal through a sensor 299 or a button input signal.

According to an embodiment, the sensor 299 may include, for example, and without limitation, an accelerometer, a gyro sensor, and/or a geomagnetic sensor, or the like. The accelerometer may, for example, sense linear motion of the stylus pen 201 and/or information about the acceleration on the three axes of the stylus pen 201. The gyro sensor may, for example, sense information related to the rotation of the stylus pen 201. The geomagnetic sensor may sense information about the direction of the stylus pen 201 in an absolute coordinate system. According to an embodiment, the sensor 299 may include a sensor capable of generating an electric signal or data value corresponding to the internal operation status or external environment of the stylus pen 201, such as, e.g., a remaining battery capacity sensor, pressure sensor, optical sensor, temperature sensor, biometric sensor, etc., as well as the sensor for measuring the motion. According to an embodiment, the processor 220 may transmit the information obtained from the sensor 299 through the communication circuit 290 to the electronic device 101. The processor 220 may transmit information (e.g., the coordinates of the stylus pen 201 and/or the displacement of the stylus pen 201) associated with the position of the stylus pen 201 based on the information obtained from the sensor 299 through the communication circuit 290 to the electronic device 101.

Figure 3B:
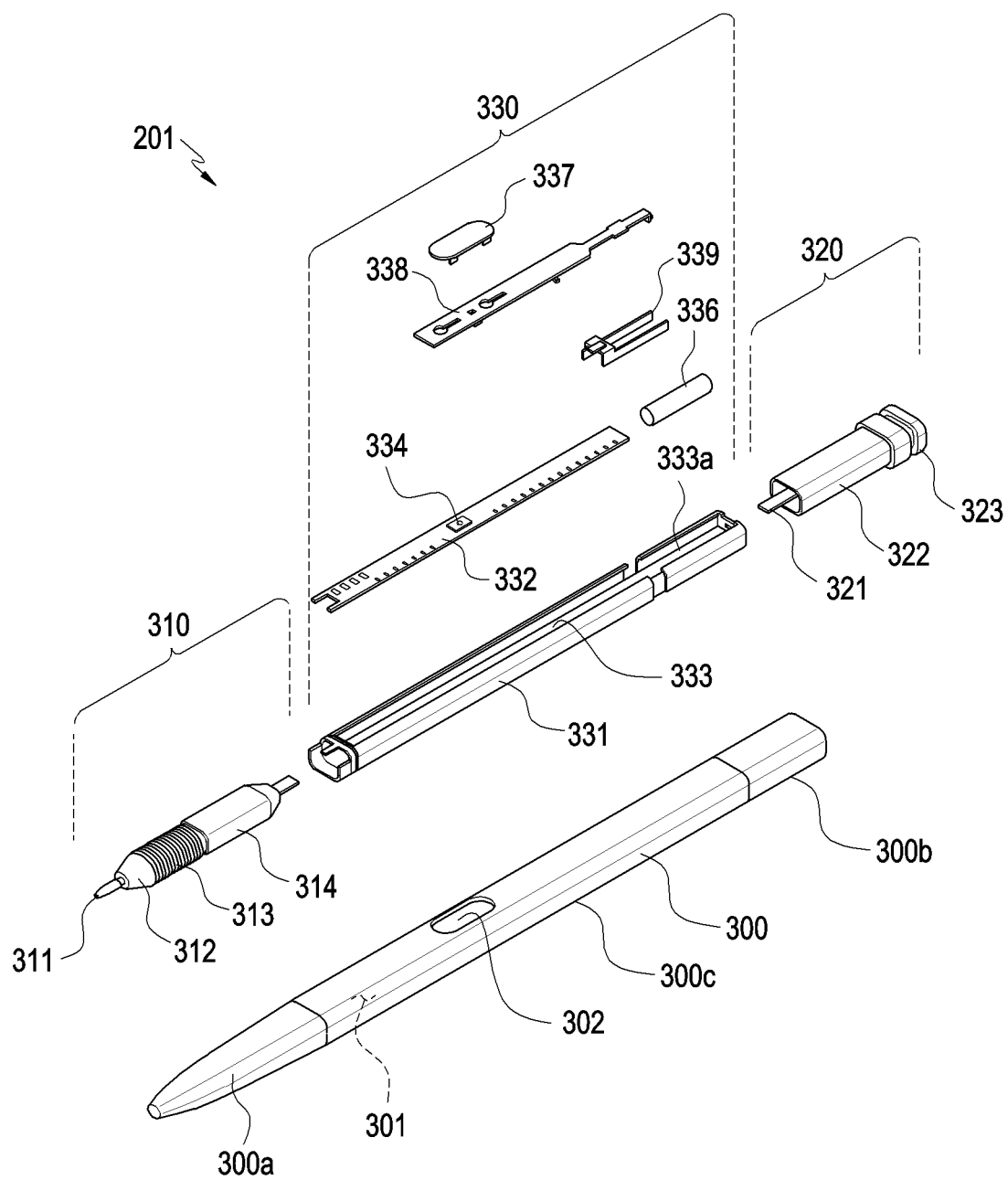
FIG. 3B is an exploded perspective view illustrating an example stylus pen according to an embodiment.

FIG. 3B is an exploded perspective view illustrating an example stylus pen (e.g., the stylus pen 201 of FIG. 2) according to an embodiment.

Referring to FIG. 3B, the stylus pen 201 may include a pen housing 300 forming the outer appearance of the stylus pen 201 and an inner assembly inside the pen housing 300. In the example embodiment shown, the inner assembly may be inserted into the pen housing 300, with several parts mounted inside the stylus pen 201 assembled together, by, for example, a single assembly operation.

The pen housing 300 may include an elongate second internal space 301 between a first end 300a, a middle portion 300c and a second end 300b. The cross section of the pen housing 300 may, for example, be shaped as an ellipse with a longer axis and a shorter axis and may overall be shaped as an elliptical cylinder. As described above in connection with FIG. 2, the first inner space 212 of the electronic device 101 may have an elliptical cross section corresponding to the shape of the pen housing 300. According to an embodiment, the pen housing 300 may at least partially include a synthetic resin (e.g., plastic) and/or a metal (e.g., aluminum). According to an embodiment, the first end 300a of the pen housing 300 may be formed of a synthetic resin. Other various embodiments may be applied to the material of the pen housing 300, and it will be understood that the disclosure is not limited to the above examples.

The inner assembly may be elongated corresponding to the shape of the pen housing 300. The inner assembly may largely be divided into three components along the lengthwise direction. For example, the inner assembly may include a coil part 310 disposed in a position corresponding to the first end 300a of the pen housing 300, an ejection member 320 disposed in a position corresponding to the second end 300b of the pen housing 300, and a circuit board part 330 disposed in a position corresponding to the body of the pen housing 300.

The coil part 310 may include a pen tip 311, which is exposed to the outside of the first end 300a when the inner assembly is fully inserted into the pen housing 300, a packing ring 312, a coil 313 wound multiple times, and/or a pen pressure sensor 314 to obtain variations in pressure when the pen tip 311 is pressurized. The packing ring 312 may include, for example, and without limitation, epoxy, rubber, urethane, silicone, or the like. The packing ring 312 may be provided for waterproof or dustproof purposes and protect the coil part 310 and the circuit board part 330 from water or dust. According to an embodiment, the coil 313 may form a resonance frequency within, for example, a preset frequency band (e.g., 500 kHz) and may be combined with at least one device (e.g., a capacitor) to adjust the resonance frequency produced by the coil 313 within a predetermined range.

The ejection member 320 may include a configuration to pull the stylus pen 201 out of the first inner space 212 of the electronic device (e.g., 101 of FIG. 2). According to an embodiment, the ejection member 320 may include a shaft 321, an ejection body 322 disposed around the shaft 321 to form the overall outer appearance of the ejection member 320, and a button part 323 (e.g., the first button 201a of FIG. 2). When the inner assembly is fully inserted into the pen housing 300, the portion including the shaft 321 and the ejection body 322 may be surrounded by the second end 300b of the pen housing 300, and at least part of the button part 323 may be exposed to the outside of the second end 300b. A plurality of parts (not shown), e.g., cam members or elastic members, may be disposed in the ejection body 322 to form a push-pull structure. According to an embodiment, the button part 323 may substantially be coupled with the shaft 321 to linearly move back and forth along the ejection body 322. According to an embodiment, the button part 323 may include a button with a jaw to allow the user to pull out the stylus pen 201 with a fingernail. According to an embodiment, the stylus pen 201 may include a sensor to detect the linear motion of the shaft 321 to thereby provide another input scheme.

The circuit board part 330 may include a printed circuit board 332, a base 331 surrounding at least one surface of the printed circuit board 332, and an antenna. According to an embodiment, a board seating part 333 may be formed on top of the base 331 to allow the printed circuit board 332 to rest, and the printed circuit board 332 may be seated and fastened onto the board seating part 333. According to an embodiment, the printed circuit board 332 may include a first surface and a second surface. A variable capacitor or a switch 334, which is connected with the coil 313, may be disposed on the first surface, and a charging circuit, a battery 336, or a communication circuit may be disposed on the second surface. According to an embodiment, the first surface and the second surface of the printed circuit board 332 may denote different surfaces stacked one over another, and in other embodiments, the first surface and the second surface may refer, for example, to different portions of the printed circuit board which are disposed along the lengthwise direction of the printed circuit board 332. The battery 336 may include, for example, an electric double layered capacitor (EDLC). The charging circuit may be positioned between the coil 313 and the battery and may include a voltage detector circuit and a rectifier. The battery 336 may not necessarily be disposed on the second surface of the printed circuit board 332. The position of the battery 336 may be set to various ones depending on various mounting structures of the circuit board 330 and may be different from the position shown in the drawings.

The antenna may include an antenna structure 339 as shown in FIG. 3B and/or an antenna embedded in the printed circuit board 332. According to an embodiment, a switch 334 may be provided on the printed circuit board 332. A second button 337 provided to the stylus pen 201 may be used to press the switch 334 and may be exposed to the outside through a side opening 302 of the pen housing 300. The second button 337 may be supported by the supporting member 338 and, if no external force is applied to the second button 337, the supporting member 338 may provide an elastic restoration force to allow the second button 337 to remain or go back to a predetermined position. The second button 337 may be implemented, for example, and without limitation, as any one of a physical key, touch key, motion key, pressure key, or keyless, but not limited to a specific type of implementation.

The circuit board part 330 may include a packing ring such as an O-ring. According to an embodiment, O-rings may be disposed at both ends of the base 331, thereby forming a sealing structure between the base 331 and the pen housing 300. According to an embodiment, the supporting member 338 may partially come in tight contact with the inner wall of the pen housing 300 around the side opening 302, thereby forming a sealing structure. For example, at least part of the circuit board part 330 may also include a waterproof, dustproof structure similar to the packing ring 312 of the coil part 310.

The stylus pen 201 may include a battery seating part 333a on the top surface of the base 331 to allow the battery 336 to sit thereon. The battery 336 mountable on the battery seating part 333a may include, e.g., a cylinder-type battery.

The stylus pen 201 may include a microphone (not shown) and/or speaker. The microphone and/or speaker may be connected directly to the printed circuit board 332 or to a separate flexible printed circuit board (FPCB) (not shown) connected with the printed circuit board 332. According to an embodiment, the microphone and/or speaker may be disposed in a position parallel with the second button 337 along the longer direction of the stylus pen 301.

Figure 4:
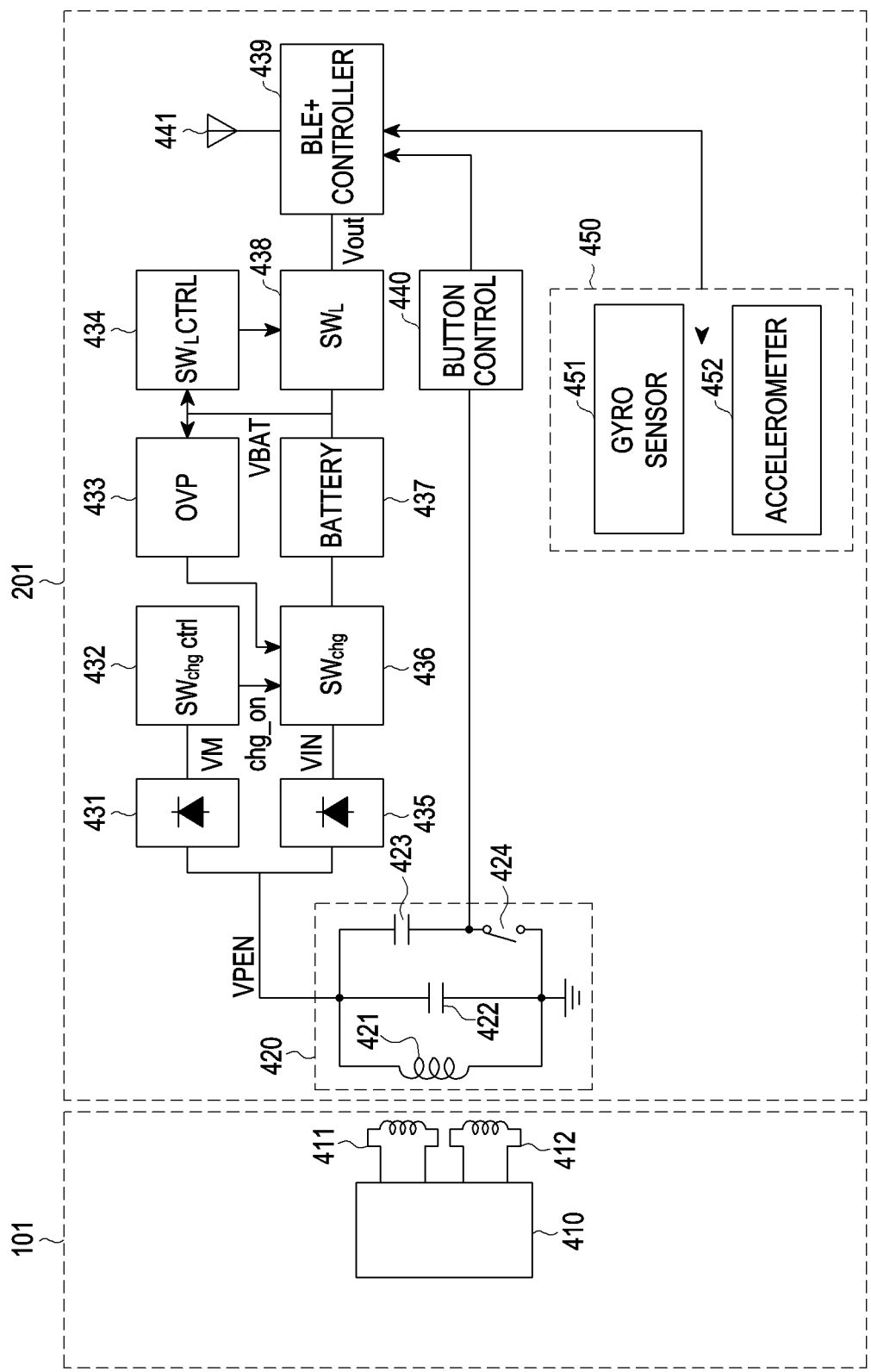
FIG. 4 is a diagram illustrating an example configuration of an electronic device and stylus pen according to an embodiment.

FIG. 4 is a diagram illustrating an example configuration of an electronic device and stylus pen according to an embodiment.

According to an embodiment, the electronic device 101 may include a pen controller 410. The pen controller 410 may include, for example, at least one amplifier connected with, e.g., at least one coil 411 and 412. The pen controller 410 may provide charging power to the stylus pen 201 via the at least one coil 411 and 412. The at least one coil 411 and 412 may be positioned adjacent to the coil 421 of the stylus pen 201 when the stylus pen 201 is in the receiving space of the electronic device 101, but its position is not limited thereto. Insertion into the receiving space is merely an example. For example, the electronic device 101 may have an area (or space) where the stylus pen 201 may be mounted (or attached) in which case the stylus pen 201 may be attached to or detached from the area (or space). According to an embodiment, it will be easily appreciated by one of ordinary skill in the art that the operations when the stylus pen 201 is positioned in the receiving space may be performed when the stylus pen 201 is attached to a mounting area (or space). At least some functions of the pen controller 410 may be performed by the processor 120, or the pen controller 410 and the processor 140 may be integrated together. The pen controller 410 may be integrated with a sensing panel controller described below. As described herein, when the pen controller 410 performs a specific operation, it may also refer, for example, to the specific operation being performed by the processor 120 or by a control circuit independent from the processor 120. The pen controller 410 may include a control circuit (e.g., a control circuit independent from the processor 120), an inverter, and/or an amplifier, as well as the at least one coil 411 and 412, but is not limited thereto. As described above, the pen controller 410 may include no control circuit in which case a signal for charging may be provided to the at least one coil 411 and 412 under the control of the processor 120.

According to an embodiment, the pen controller 410 may provide a signal with a pattern via the at least one coil 411 and 412. The pattern may be previously shared with the stylus pen 201 for controlling the stylus pen 201 and may include, but is not limited to, a charging initiation indication pattern, a charging termination indication pattern, a detection pattern, or the like. Although two coils 411 and 412 are shown to provide a charging signal or pattern signal for control, this is merely an example, and the number of the coils is not limited thereto.

According to an embodiment, the resonance circuit 420 (e.g., the resonance circuit 287 of FIG. 3A) of the stylus pen 201 may include a coil 421, at least one capacitor 422 and 423, and/or a switch 424. When the switch 424 is in an off state, the coil 421 and the capacitor 422 may form a resonance circuit and, when the switch 424 is in an on state, the coil 421 and the capacitors 422 and 423 may form a resonance circuit. Thus, the resonance frequency of the resonance circuit 420 may be varied depending on the on/off state of the switch 424. For example, the electronic device 101 may identify the on/off state of the switch 424 based on the frequency of a signal from the stylus pen 201. For example, when the button 337 of the stylus pen 201 is pressed/released, the switch 424 may be turned on/off, and the electronic device 101 may identify whether the button 337 of the stylus pen 201 is pressed based on the frequency of a reception signal identified via the digitizer.

According to an embodiment, at least one rectifier 431 and 435 may rectify an alternating current (AC) waveform of signal VPEN output from the resonance circuit 420 and output the rectified signal. The charging switch controller $SW_{chg}$ ctrl 432 may receive the rectified signal VM output from the rectifier 431. Based on the rectified signal VM, the charging switch controller 432 may identify whether the signal generated from the resonance circuit is a signal for charging or a signal for detecting the position. For example, the charging switch controller 432 may identify whether the signal generated from the resonance circuit is a signal for charging or a signal for detecting the position based on, e.g., the magnitude of the voltage of the rectified signal VM. The charging switch controller 432 may identify whether a signal with a charging initiation pattern is input based on the waveform of the rectified signal VM.

According to an embodiment, upon identifying that that the signal is a signal for charging, the charging switch controller 432 may turn on the charging switch $SW_{chg}$ 436. Upon detecting a signal with the charging initiation pattern, the charging switch controller 432 may turn on the charging switch $SW_{chg}$ 436. The charging switch controller 432 may transfer a charging initiation signal chg_on to the charging switch 436. In this example, the rectified signal VIN may be transferred through the charging switch 436 to a battery 437 (e.g., the battery 289 of FIG. 3A). The battery 437 may be charged with the received rectified signal VIN. An over-voltage protection circuit (OVP) 433 may identify the battery voltage VBAT and, when the battery voltage exceeds an over-voltage threshold, turn off the charging switch 436.

According to an embodiment, a load switch controller $SW_L$ ctrl 434, upon identifying that the battery voltage exceeds an operation voltage threshold, may turn on a load switch $SW_L$ 438. When the load switch 438 turns on, power from the battery 437 may be transferred to the BLE communication circuit and controller (BLE+controller) 439 (e.g., the communication circuit 290 and processor 220 of FIG. 3A). The BLE communication circuit and controller 439 may be operated using the received power. When the distance between the stylus pen 201 and the electronic device 101 is larger than a threshold distance, a button control circuit 440 may transfer information about an input of the button (e.g., the button 337) to the BLE communication circuit and controller 439. The BLE communication circuit and controller 439 may transmit the received button input information through the antenna 441 (e.g., the antenna 297 of FIG. 3A) to the electronic device 101. A sensor 450 (e.g., the sensor 299 of FIG. 3A) may include a gyro sensor 451 and/or an accelerometer 452. Sensing data obtained by the gyro sensor 451 and/or the accelerometer 452 may be transferred to the BLE communication circuit and controller 439. The BLE communication circuit and controller 439 may transmit a communication signal including the received sending data through the antenna 441 to the electronic device 101. The BLE communication circuit and controller 439 may identify information (e.g., the coordinates and/or displacement of the stylus pen 201) associated with the position of the stylus pen 201 identified based on the received sending data. The BLE communication circuit and controller 439 may transmit the identified information associated with the position of the stylus pen 201 through the antenna 441 to the electronic device 101. According to an embodiment, when the stylus pen 201 is removed from the electronic device 101, the BLE communication circuit and controller 439 may activate the accelerometer 452. When the button (e.g., the button 337) is pressed, the BLE communication circuit and controller 439 may activate the gyro sensor 451. The time of activation is merely an example, and no limitation is posed on the time of activation per sensor. Further, the sensor 450 may further include a geomagnetic sensor. When only the accelerometer 452 is activated, the stylus pen 201 may provide acceleration information measured by the accelerometer 452 to the electronic device 101, and the electronic device 101 may be operated based on both the acceleration information and the position of the stylus pen 201 identified based on the pen signal.

Figure 5:
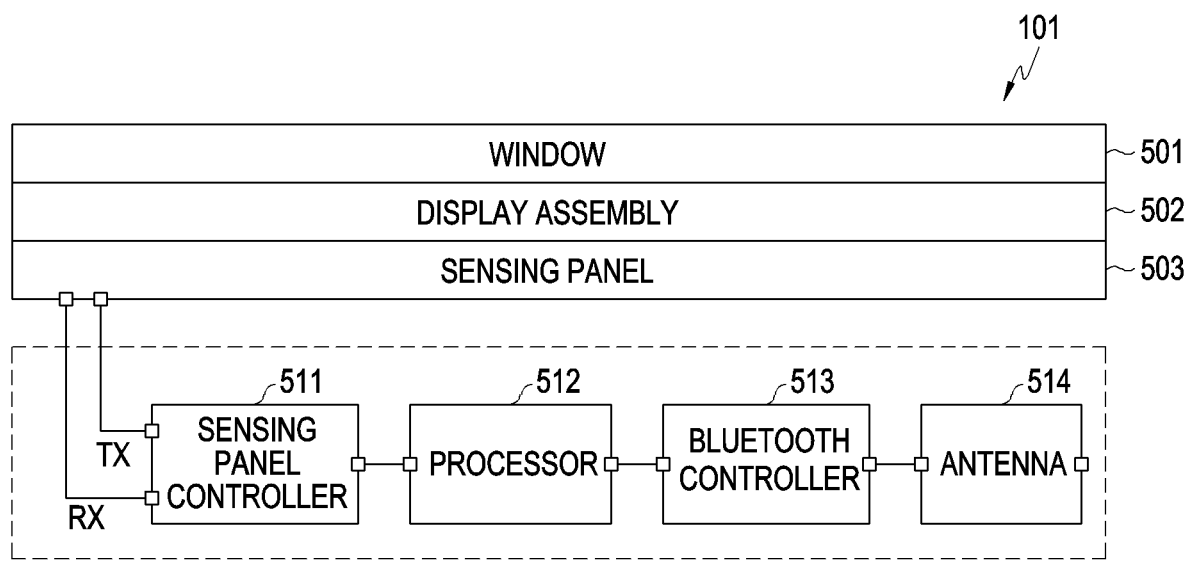
FIG. 5 is a diagram illustrating an example configuration of an example electronic device according to an embodiment.

FIG. 5 is a diagram illustrating an example configuration of an electronic device according to an embodiment.

According to an embodiment, an electronic device 101 may include a sensing panel controller (e.g., sensing panel control circuitry) 511, a processor (e.g., including processing circuitry) 512 (e.g., the processor 120), a Bluetooth controller (e.g., including Bluetooth control circuitry) 513 (e.g., the communication module 190), and/or an antenna 514. The electronic device 101 may include a sensing panel 503, a display assembly 502 disposed on the sensing panel 503, and/or a window 501 disposed on the display assembly 502. According to an example implementation, when the sensing panel 503 may be implemented as a digitizer, a touch sensor panel may further be disposed thereover or thereunder to sense the user's touch. The touch sensor panel may be positioned on the display assembly 502, according to an implementation. As described above, the sensing panel 503 may be implemented as a digitizer and may include a plurality of loop coils. According to an embodiment, when implemented as a digitizer, the sensing panel 503 may include an element (e.g., an amplifier) for applying electrical signals (e.g., transmission signals) to the loop coils. The sensing panel 503 may include an element (e.g., an amplifier, capacitor, or analog-digital converter (ADC)) for processing signals (e.g., input signals) output from the loop coils. The sensing panel 503 may identify the position of the stylus pen 201 based on the magnitudes (e.g., digital values converted into per channel) of signals output from the loop coils and output the position to the processor 120. According to an implementation, the processor 120 may include various processing circuitry and identify the position of the stylus pen 201 based on the magnitudes (e.g., digital values converted into per channel) output from the loop coils. For example, the sensing panel 503 may apply a current to at least one of the loop coils, and the at least one coil may create a magnetic field. The stylus pen 201 may be resonated by the magnetic field created around, and a magnetic field may be created by the resonance from the stylus pen 201. By the magnetic field created from the stylus pen 201, a current may be output from each of the loop coils. The electronic device 101 may identify the position of the stylus pen 201 based on the per-channel current magnitudes (e.g., digital values converted into) of the loop coils. To determine the position of the stylus pen 201, the loop coils may include coils extending in one axial (e.g., the x axis) direction and coils extending in another axial (e.g., the y axis) direction, but their array is not limited to any specific one. The sensing panel controller 511 may apply transmission signals Tx to at least some of the plurality of loop coils of the sensing panel 503, and the loop coils receiving the transmit signals Tx may create a magnetic field. The sensing panel controller 511 may receive reception signals Rx from at least some of the plurality of loop coils in a time-division manner. The sensing panel controller 511 may identify the position of the stylus pen 201 based on the reception signal Rx and transfer the position of the stylus pen 201 to the processor 512. For example, the magnitude of the reception signal Rx may differ per loop coil (e.g., per channel), and the position of the stylus pen 201 may be identified based on the magnitudes of the received signals. The electronic device 101 may identify whether the button (e.g., the button 337) of the stylus pen 201 is pressed based on the frequency of the received signal. For example, when the frequency of the received signal is a first frequency, the electronic device 101 may identify that the button of the stylus pen 201 has been pressed and, when the frequency of the received signal is a second frequency, the electronic device 101 may identify that the button of the stylus pen 201 has been released. When the sensing panel is implemented as a touch sensing panel (e.g., a touchscreen panel (TSP)), the sensing panel 503 may identify the position of the stylus pen 201 based on a signal output from an electrode. The electronic device 101 may detect the pen based on a variation in capacitance (e.g., mutual capacitance and/or self-capacitance) at the electrode of the sensing panel 503. A digitizer or hardware capable of sensing a pen signal from the stylus pen of the touch sensing panel may be denoted as the sensing panel 503. When the position of the stylus pen 201 is identified by the touch sensing panel, the electronic device 101 may identify whether the button is pressed based on the received communication signal. According to an embodiment, the electronic device 101 may recognize static electricity based on an AES scheme, thereby detecting the stylus pen (or the position of the stylus pen).

The sensing panel controller 511 may identify whether the stylus pen 201 is inserted into the electronic device 101 (or combined or attached) based on the received signal and transfer the same to the processor 512. According to an implementation, the sensing panel controller 511 may be integrated with the sensing panel 503. The processor 512 may transmit a signal for wireless charging based on whether the stylus pen 201 is inserted. The processor 512 may control the Bluetooth controller 513 based on whether the stylus pen 201 is inserted and, when no wireless communication connection is formed, control it to form a wireless communication connection to the stylus pen 201. When the stylus pen 201 is inserted, the processor 512 may transmit charging capacity information to the electronic device 101 and, when the stylus pen 201 is removed, transmit information about a pressing of the button or sensor data to the electronic device 101. The processor 512 may perform control to transmit a charging signal and control signal to the sensing panel controller 511 based on the data received from the stylus pen 201. The processor 512 may identify the gesture of the stylus pen 201 based on the data received from the stylus pen 201 and perform an operation corresponding to the gesture. The processor 512 may transfer a function mapped to the gesture to an application. The Bluetooth controller 513 may transmit/receive information to/from the stylus pen 201 via the antenna 514. The display assembly 502 may include an element for displaying a screen. The window 501 may be formed of a transparent material to allow at least part of the display assembly 502 to be visually exposed.

Figure 6A:
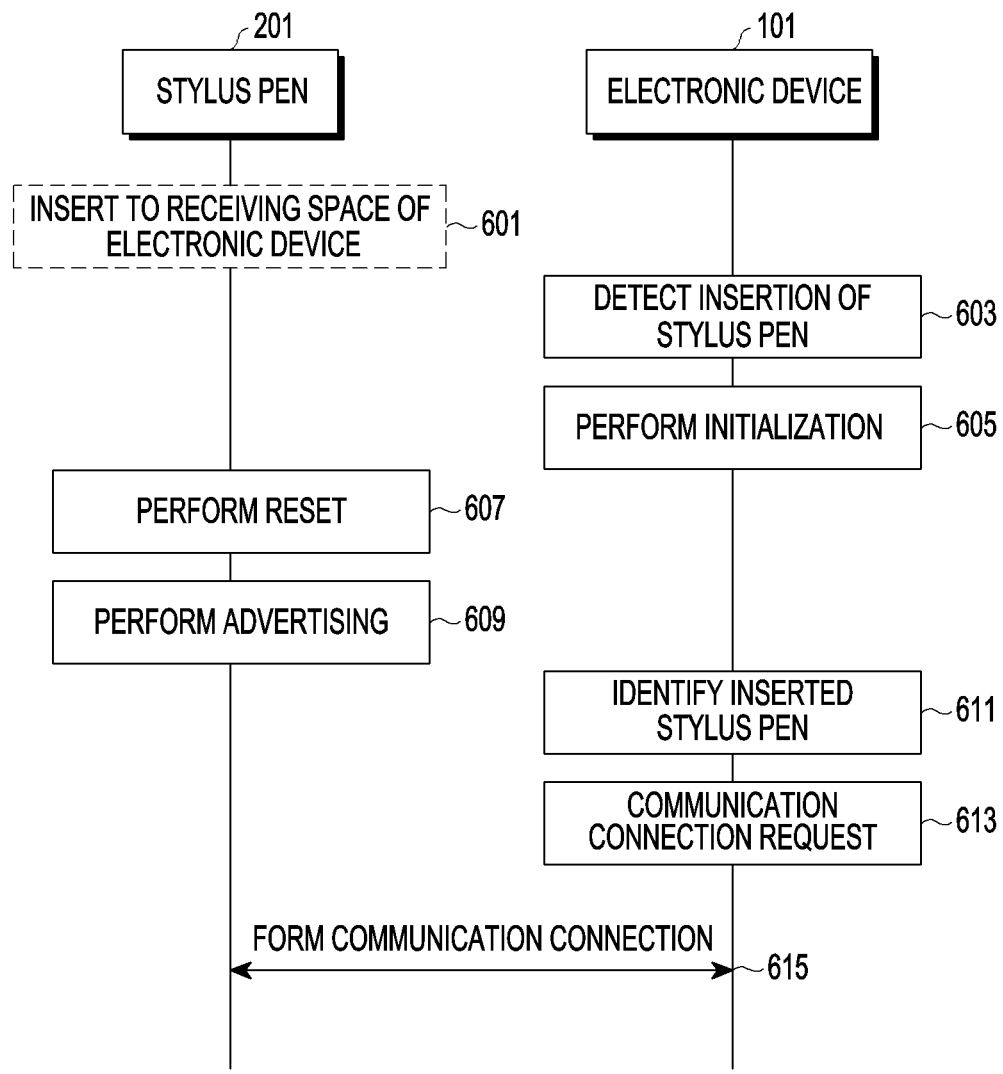
FIG. 6A is a flow diagram illustrating example operations of a stylus pen and an electronic device when the stylus pen is inserted into the electronic device, according to an embodiment.

FIG. 6A is a flow diagram illustrating example operations of a stylus pen and an electronic device when the stylus pen is inserted into the electronic device, according to an embodiment.

According to an embodiment, in operation 601, the stylus pen 201 may be inserted into the receiving space of the electronic device 101. For example, the user may insert the stylus pen 201 into the receiving space of the electronic device 101, and this operation is shown in dashed lines based on not being an active operation of the stylus pen 201. The embodiment of FIG. 6A may refer to an example in which the stylus pen 201 is inserted into the electronic device 101 before a communication connection is formed between the stylus pen 201 and the electronic device 101. As described herein, when the electronic device 101 or stylus pen 201 performs a specific operation, this may refer, for example, to the processor 120 included in the electronic device 101 or the processor 220 included in the stylus pen 201 performing the specific operation. When the electronic device 101 or stylus pen 201 performs a specific operation, this may refer, for example, to the processor 120 included in the electronic device 101 or the processor 220 included in the stylus pen 201 controlling other hardware to perform the specific operation. When the electronic device 101 or stylus pen 201 performs a specific operation, this may refer, for example, to the instructions stored in the memory being executed or stored to enable the processor 120 included in the electronic device 101 or the processor 220 included in the stylus pen 201 to perform the specific operation.

According to an embodiment, in operation 603, the electronic device 101 may detect an insertion of the stylus pen 201. For example, the electronic device 101 may detect an insertion of the stylus pen 201 based on a reception signal received from the stylus pen 201 in response to a transmission signal transmitted through the digitizer, but it will be easily appreciated by one of ordinary skill in the art that detection of insertion is not limited to a specific scheme. In operation 605, the electronic device 101 may perform an initialization operation. For example, the electronic device 101 may transfer a reset command to the stylus pen 201. In operation 607, the stylus pen 201 may perform the reset operation. For example, the stylus pen 201 may release an existing BLE connection. In operation 609, the stylus pen 201 may perform an advertising operation. For example, the stylus pen 201 may broadcast advertisement signals. In operation 611, the electronic device 101 may identify the inserted stylus pen 201. The electronic device 101 may identify the inserted stylus pen 201 based on the received advertisement signal. In operation 613, the electronic device 101 may send a request for communication connection. For example, the electronic device 101 may transmit a connection request signal corresponding to the advertisement signal. In operation 615, the stylus pen 201 may form a communication connection with the electronic device 101.

Figure 6B:
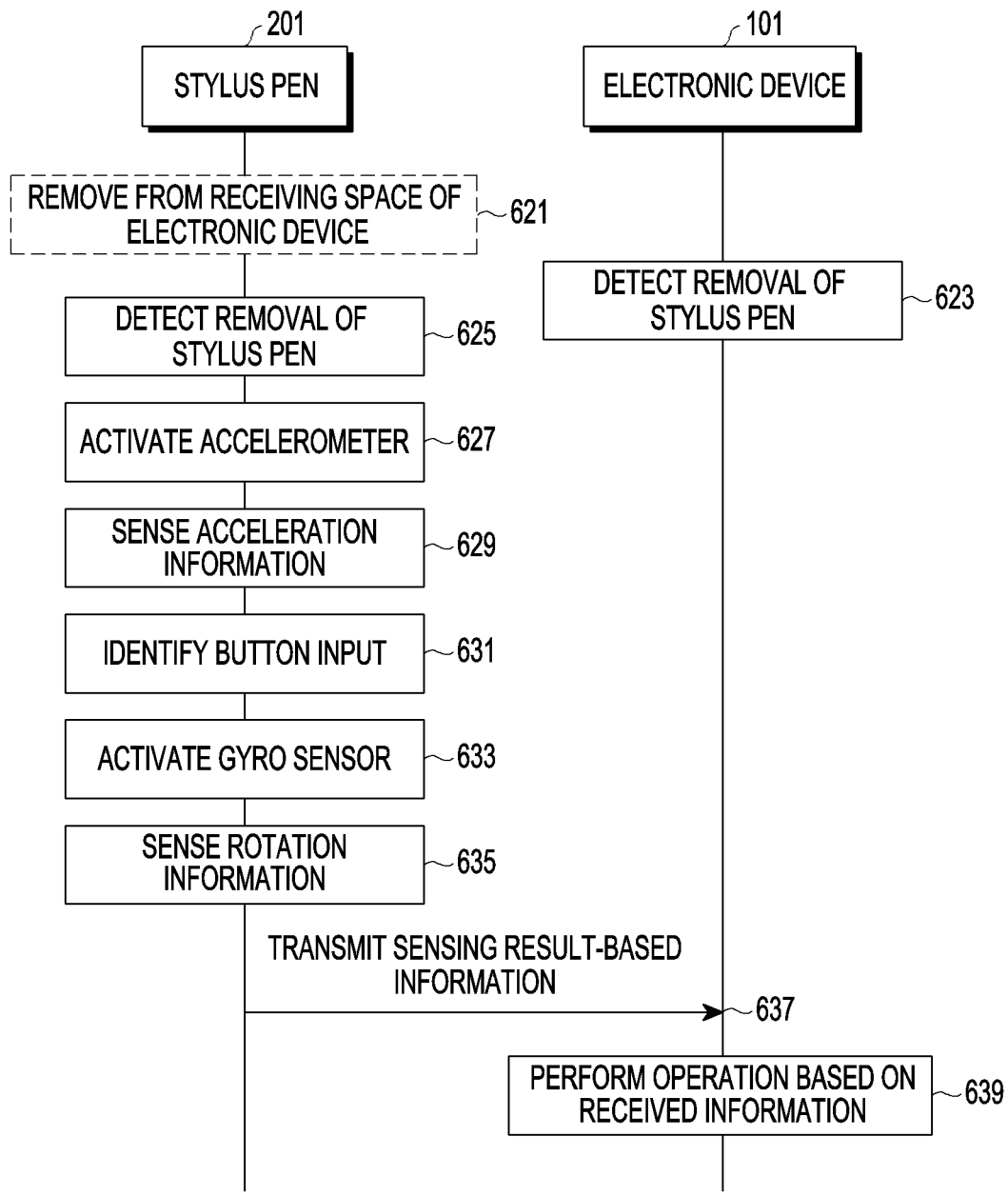
FIG. 6B is a flow diagram illustrating example operations of a stylus pen and an electronic device when the stylus pen is removed from the electronic device, according to an embodiment.

FIG. 6B is a flow diagram illustrating example operations of a stylus pen and an electronic device when the stylus pen is removed from the electronic device, according to an embodiment.

According to an embodiment, in operation 621, the stylus pen 201 may be removed from the receiving space of the electronic device 101. For example, the user may pull the stylus pen 201 out of the receiving space of the electronic device 101. In operation 623, the electronic device 101 may detect the removal of the stylus pen 201. For example, the electronic device 101 may detect the removal of the stylus pen 201 based on failure to receive a signal from the stylus pen 201, but not limited to a specific method for detecting the removal. In operation 625, the stylus pen 201 may detect the removal of the stylus pen 201. For example, the stylus pen 201 may detect the removal of the stylus pen 101 based on failure to receive a signal from the electronic device 101, but it is not limited to a specific method for detecting the removal. Upon detecting the removal, the stylus pen 201 may exchange parameters (e.g., connection interval and/or slave latency) with the electronic device 101.

According to an embodiment, the stylus pen 201 may activate the accelerometer based on detection of the removal in operation 627. The stylus pen 201 may sense acceleration information about the stylus pen 201 via the activated accelerometer in operation 629. Although not shown, the stylus pen 201 may transmit the sensed acceleration information to the electronic device 101. According to an embodiment, the electronic device 101 may perform an operation based on the received acceleration information. According to an embodiment, the stylus pen 201 may be configured to activate the accelerometer while keeping the gyro sensor, which consumes relatively high power, inactive.

According to an embodiment, the stylus pen 201 may identify an input of the button (e.g., the button 337) in operation 631. The button may be implemented, for example, and without limitation, as any one of a physical key, touch key, motion key, pressure key, keyless, or the like, but not limited to a specific type of implementation. Upon identifying a button input, the stylus pen 201 may activate the gyro sensor in operation 633. The stylus pen 201 may sense rotation information via the activated gyro sensor in operation 635. In operation 637, the stylus pen 201 may transmit information based on the result of sensing. For example, the stylus pen 201 may transmit sensing information obtained via the accelerometer and gyro sensor to the electronic device 101. The stylus pen 201 may identify the coordinates (e.g., two-dimensional coordinates or three-dimensional coordinates) of the stylus pen 201 based on the sensing information obtained via the accelerometer and gyro sensor and transmit the identified coordinates to the electronic device 101. The stylus pen 201 may identify displacement information about the coordinates (e.g., two-dimensional coordinates or three-dimensional coordinates) of the stylus pen 201 based on the sensing information obtained via the accelerometer and gyro sensor and transmit the identified displacement information to the electronic device 101. In operation 639, the electronic device 101 may perform an operation based on the received information. Upon receiving the sensing information, the electronic device 101 may identify the position information about the stylus pen 201 based on the sensing information, identify a gesture corresponding to the position information, and perform an operation corresponding to the gesture. Upon receiving the position information about the stylus pen 201, the electronic device 101 may identify the gesture corresponding to the position information and perform an operation corresponding to the gesture. For example, the stylus pen 201 may transmit information to the electronic device 101 until the pen button input is released. The electronic device 101 may identify the gesture based on the position information about the stylus pen 201 identified until the release of the button input is detected. Upon detecting the release of the button input, the stylus pen 201 may again deactivate the gyro sensor. According to an embodiment, the stylus pen 201 may activate both the gyro sensor and the accelerometer from the time of detecting removal. In this example, the position information about the stylus pen 201 before the button input may be used to correct the direction of gesture, allowing for better accuracy for gesture recognition. For example, the electronic device 101 may identify initial posture information about the stylus pen 201 and recognize the gesture using a displacement based on the initial posture information.

Figure 6C:
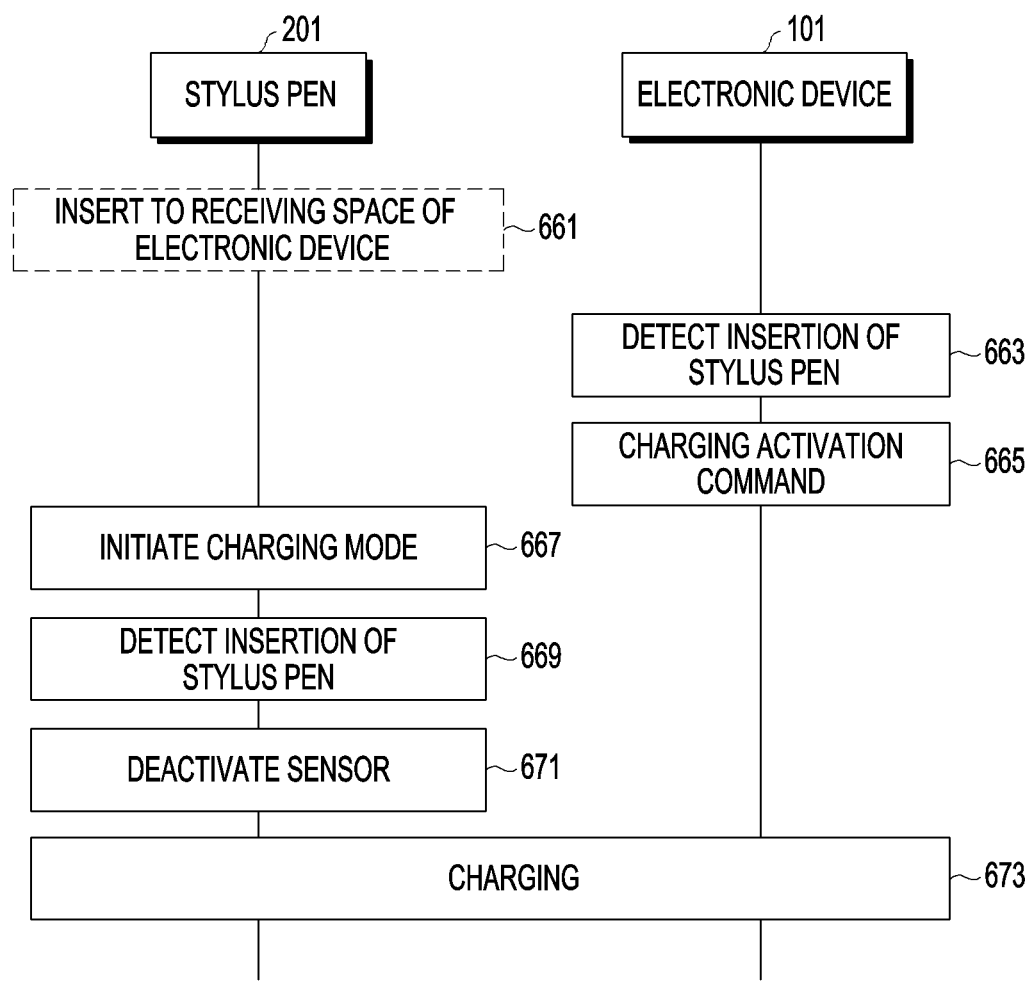
FIG. 6C is a flow diagram illustrating example operations of an electronic device and a stylus pen when the stylus pen is inserted, according to an embodiment.

FIG. 6C is a flow diagram illustrating example operations of an electronic device and a stylus pen when the stylus pen is inserted, according to an embodiment.

According to an embodiment, in operation 661, the stylus pen 201 may be inserted into the receiving space of the electronic device 101. For example, after its initial insertion, the stylus pen 201 may be removed from, or inserted back into, the receiving space. In operation 663, the electronic device 101 may detect the insertion of the stylus pen 201. In operation 665, the electronic device 101 may command the stylus pen 201 to activate charging. The electronic device 101 may command to activate charging based on transmission of, e.g., a signal with a pattern via a receiving space coil or a communication signal via the communication module. In operation 667, the stylus pen 201 may initiate a charging mode. In operation 669, the stylus pen 201 may detect an insertion of the stylus pen 201. The stylus pen 201 may identify whether it is inserted based on information received from the electronic device 101 or the magnitude of voltage applied to the resonance circuit (or output terminal of the rectifier) of the stylus pen 201. In operation 671, the stylus pen 201 may deactivate the sensors. The stylus pen 201 may deactivate some sensors or be configured to skip sensor deactivation. In operation 673, the electronic device 101 and the stylus pen 201 may perform charging. According to an embodiment, charging 673 may be performed immediately after the charging mode is initiated in operation 667, but the time of performing charging is not limited to a specific time.

Figure 7:
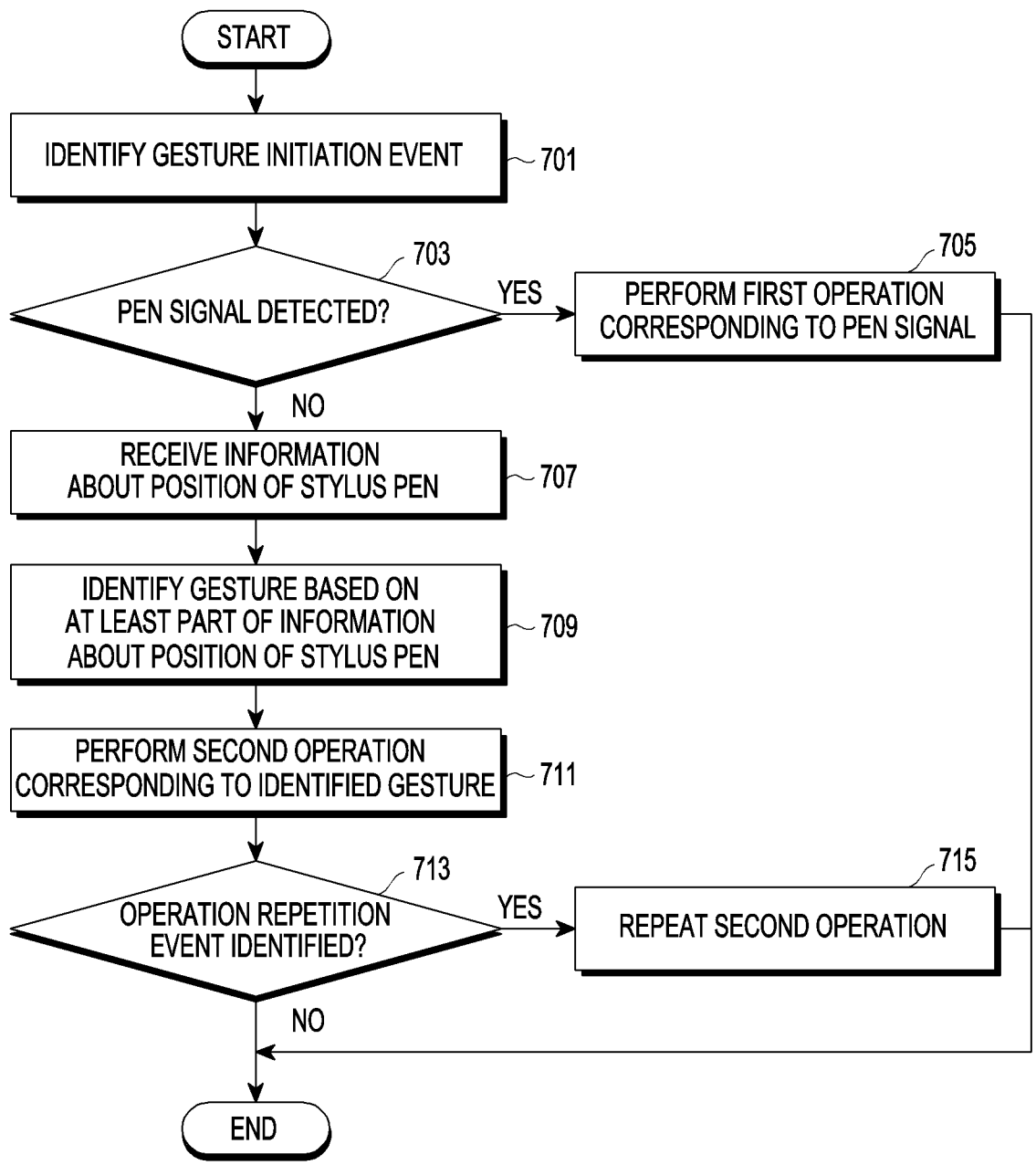
FIG. 7 is a flowchart illustrating an example method for operating an electronic device according to an embodiment.

FIG. 7 is a flowchart illustrating an example method for operating an electronic device according to an embodiment.

According to an embodiment, in operation 701, the electronic device 101 may identify a gesture initiation event. For example, the electronic device 101 may identify the gesture initiation event based on information included in the communication signal from the stylus pen 201. The gesture initiation event may include, for example, detection of the pressed state of the button (e.g., the button 337) of the stylus pen 201. Upon identifying the pressed state of the button, the stylus pen 201 may transmit a communication signal including information indicating the pressed state of the button to the electronic device 101. The electronic device 101 may identify the gesture initiation event based on the information included in the received communication signal, but identifying the gesture initiation event is not limited to a specific scheme.

According to an embodiment, in operation 703, the electronic device 101 may identify whether a pen signal is detected. For example, the electronic device 101 may apply a transmission signal to the loop coil included in the digitizer. After applying the transmission signal, the electronic device 101 may identify that a pen signal is detected when the magnitude of a signal output from the loop coil included in the digitizer is a threshold magnitude or more. When the magnitude of a signal output from the loop coil included in the digitizer is less than the threshold magnitude, the electronic device 101 may identify that no pen signal is detected. When the stylus pen 201 is positioned near the electronic device 101, the resonance circuit of the stylus pen 201 may be resonated by a signal from the loop coil included in the digitizer. The signal (e.g., an EMR signal) generated by resonance may create an induced electromotive force around the loop coil included in the digitizer, so that a signal may be output from each loop coil. When the distance between the electronic device 101 and the stylus pen 201 is relatively large, the magnitude of the signal output from the loop coil may be relatively small and, when the distance between the electronic device 101 and the stylus pen 201 is relatively small, the magnitude of the signal output from the loop coil may be relatively large. Thus, the electronic device 101 may identify that a pen signal is detected when the magnitude of a signal output from the loop coil is a threshold magnitude or more. When the electronic device 101 is implemented to identify the position of the stylus pen 201 in an ECR scheme or type-C scheme, the electronic device 101 may detect the pen when a variation in the capacitance (e.g., self-capacitance or mutual capacitance) of the touch panel is a threshold variation or more, and such case may also be represented as having detected a pen signal.

Upon identifying that a pen signal is detected (yes in operation 703), the electronic device 101 may perform a first operation corresponding to the pen signal in operation 705. The electronic device 101 may identify the position of the stylus pen 201 over the electronic device 101 (e.g., the display device 160) based on the pen signal and perform the first operation corresponding to the identified position of the stylus pen 201. For example, the electronic device 101 may perform a function corresponding to an icon displayed on the display device 160. The electronic device 101 may display a drawing object on the display device 160 as the stylus pen 201 moves. The electronic device 101 may perform the function corresponding to the pressed state of the pen button, and the first operation is not limited to a specific one.

According to an embodiment, when no pen signal is detected (no in operation 703), the electronic device 101 may receive information about the position of the stylus pen 201 in operation 707. The electronic device 101 may receive at least one communication signal from the stylus pen 201 and identify information about the position of the stylus pen 201 included in each of the at least one communication signal received. The information about the position of the stylus pen 201 may include, for example, and without limitation, at least one of sensing data (e.g., raw data), coordinates, displacement, etc. of the stylus pen 201. The electronic device 101 may identify the time-series positions of the stylus pen 201. In operation 709, the electronic device 101 may identify a gesture based on at least part of the information about the position of the stylus pen 201. Upon detecting a pen signal, the electronic device 101 may also receive the information about the position of the stylus pen 201 in which case the signal may be disregarded. In operation 711, the electronic device 101 may perform a second operation corresponding to the identified gesture. The second operation may be set to differ from the first operation. The electronic device 101 may map an operation corresponding to a gesture and identify and perform the mapped operation.

According to an embodiment, the electronic device 101 may identify whether an operation repetition event is detected in operation 713. The electronic device 101 may identify whether the operation repetition event is detected based on, e.g., the information included in the communication signal from the stylus pen 201. For example, when the position of the stylus pen 201 is fixed, with the button of the stylus pen 201 remaining pressed, the electronic device 101 may identify that the operation repetition event has been detected. It will be appreciated by one of ordinary skill in the art that the operation repetition event is not limited to a particular kind or type. Upon identifying that the operation repetition event is detected (yes in operation 713), the electronic device 101 may repeat the second operation in operation 715. For example, the electronic device 101 may repeat the operation (e.g., the second operation) that was performed immediately before the operation repetition event is detected. For example, the framework (e.g., a manager) of the electronic device 101 may retransmit an event related to the determined gesture to an application. By receiving the event again, the application may perform the operation mapped to the event, thus repeating the operation. When detection of the operation repetition event is not identified (no in operation 713), the electronic device 101 may refrain from repeating the second operation, thereby performing the second operation once.

Figure 8A:
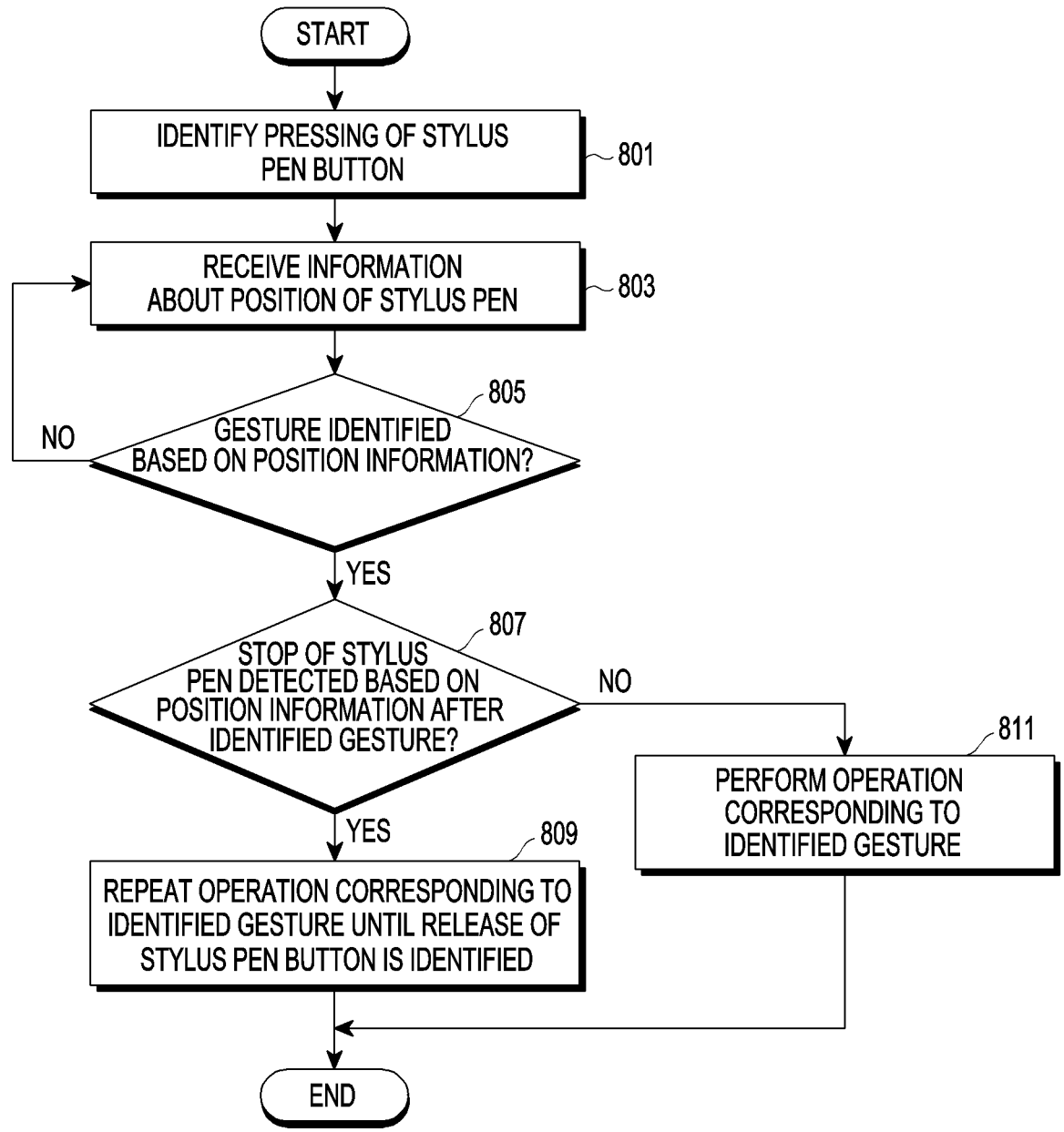
FIG. 8A is a flowchart illustrating an example method for operating an electronic device according to an embodiment.

FIG. 8A is a flowchart illustrating an example method for operating an electronic device according to an embodiment.

According to an embodiment, in operation 801, the electronic device 101 may identify a pressing of the button (e.g., the button 337) of the stylus pen 201. The electronic device 101 may receive a communication signal including information indicating the pressed state of the button of the stylus pen 201 from the stylus pen 201. The electronic device 101 may, for example, identify the pressed state of the button based on a variation in the frequency of the output from the digitizer. In operation 803, the electronic device 101 may receive information about the position of the stylus pen 201. The electronic device 101 may, for example, receive a communication signal from the stylus pen 201. The communication signal may include information (e.g., at least one of sensing information, coordinates, or displacement) about the position of the stylus pen 201. In operation 805, the electronic device 101 may identify whether a gesture is identified based on the position information. For example, the electronic device 101 may execute a detector (e.g., a swipe gesture detector or a circle gesture detector) for detecting a plurality of gestures. Detectors may include, for example, a determination algorithm executed by, e.g., the processor 120 and may output a specific gesture based on the received position information (e.g., coordinates). The electronic device 101 may identify whether a gesture is identified based on the result of information processing on the position for the detector. When no gesture is identified (no in operation 805), the electronic device 101 may continuously receive position information from the stylus pen 201. When the position information is accumulated in a time-series manner, the electronic device 101 may identify whether a gesture is detected based on at least part of the position information.

According to an embodiment, when a gesture is identified (yes in operation 805), the electronic device 101 may identify whether a stop of the stylus pen 201 is detected based on the position information after the gesture is identified. Even after the gesture is identified, the electronic device 101 may keep on receiving position information and identify whether the stylus pen 201 stops based on the position information. For example, when the displacement of the stylus pen 201 is less than a threshold, the electronic device 101 may identify that the stylus pen 201 has stopped. Upon detecting a stop of the stylus pen 201 (yes in operation 807), the electronic device 101 may repeat the operation corresponding to the identified gestured until the button of the stylus pen 201 is released in operation 809. For example, the electronic device 101 may receive a communication signal including information indicating a button release from the stylus pen 201 and, until before the communication signal is received, repeat the operation corresponding to the gesture. The button release may be merely an example for stopping the repetition and how to stop the repetition is not limited thereto. For example, the electronic device 101 may receive position information from the stylus pen 201 and, based thereupon, identify that the stylus pen 201 resumes moving. The electronic device 101 may be configured to stop repeating the operation corresponding to the gesture using the resuming as a trigger, but an event for stopping the repetition is not limited thereto. When no stop of the stylus pen 201 is detected (no in operation 807), the electronic device 101 may perform the operation corresponding to the identified gesture once (or a designated number of times) in operation 811. When no stop of the stylus pen 201 is detected, the electronic device 101 may refrain from performing the operation corresponding to the gesture. Upon identifying that the button of the stylus pen 201 is released, the electronic device 101 may perform the operation corresponding to the gesture.

Figure 8B:
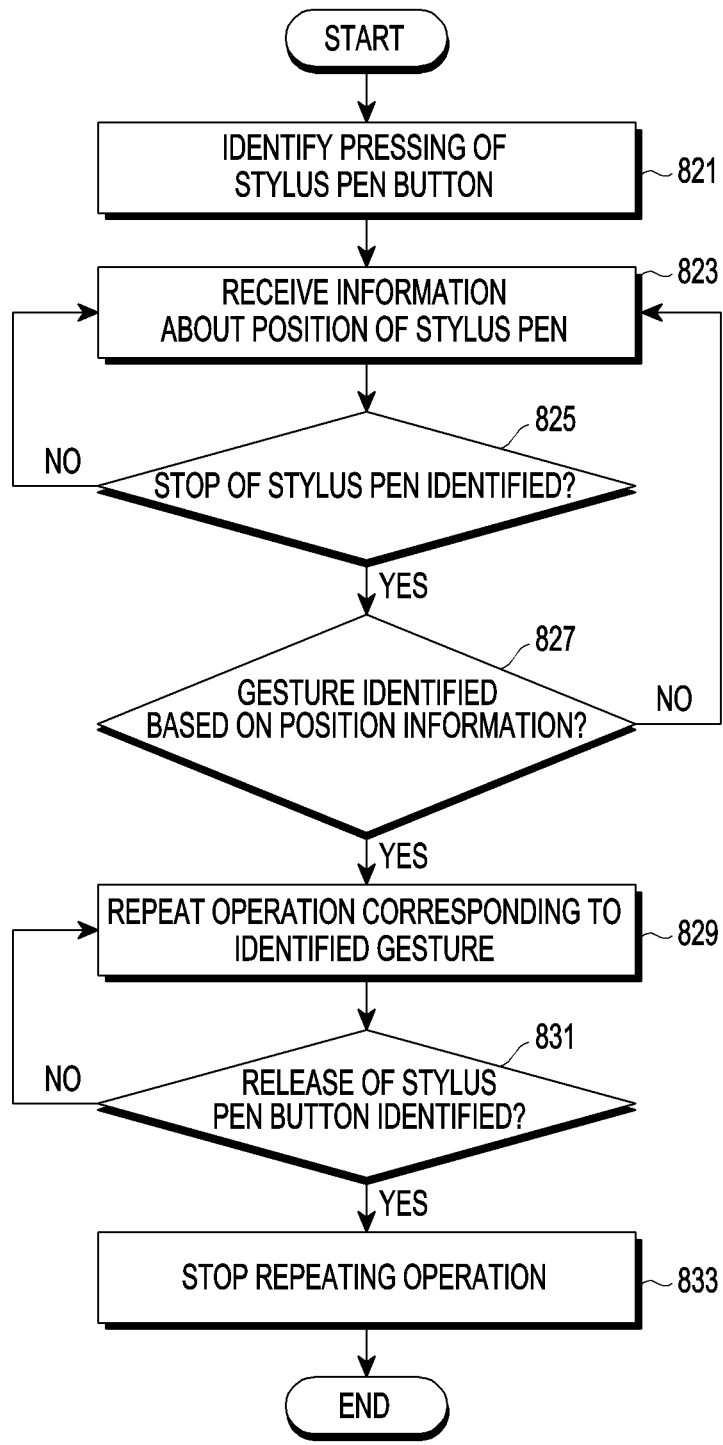
FIG. 8B is a flowchart illustrating an example method for operating an electronic device according to an embodiment.

FIG. 8B is a flowchart illustrating an example method for operating an electronic device according to an embodiment.

According to an embodiment, the electronic device 101 may identify a pressing of the button of the stylus pen 201 in operation 821. The electronic device 101 may receive a communication signal including information indicating the button pressing from the stylus pen 201. In operation 823, the electronic device 101 may receive information about the position of the stylus pen 201. In operation 825, the electronic device 101 may identify whether the stylus pen 201 stops. For example, when the displacement of the stylus pen 201 is less than a threshold based on the position information about the stylus pen 201, the electronic device 101 may identify that the stylus pen 201 has stopped. When no stop of the stylus pen 201 is identified (no in operation 825), the electronic device 101 may continuously receive the position information about the stylus pen 201.

According to an embodiment, upon identifying that the stylus pen 201 stops (yes in operation 825), the electronic device 101 may identify whether a gesture is identified based on the position information in operation 827. When no gesture is identified (no in operation 827), the electronic device 101 may continuously receive the position information about the stylus pen 201. When a gesture is identified (yes in operation 827), the electronic device 101 may repeat the operation corresponding to the identified gesture in operation 829. In operation 831, the electronic device 101 may identify whether the button of the stylus pen 201 is released. The electronic device 101 may identify whether the button of the stylus pen 201 is released based, for example, on whether a communication signal received from the stylus pen 201 includes information indicating that the button is released. When the button of the stylus pen 201 is not identified to be released (no in operation 831), the electronic device 101 may repeat the operation corresponding to the identified gesture. When the button of the stylus pen 201 is identified to be released (yes in operation 831), the electronic device 101 may stop repeating the operation in operation 833.

FIG. 9A is a diagram illustrating an example of repeating an execution of an operation according to an embodiment.

According to an embodiment, the electronic device 101 may execute a music play application and display a first execution screen 901 of the music play application. The first execution screen 901 may, for example, include a visual element for controlling the playback of music, a progress bar, and information about the current sound volume. For example, the current sound volume on the first execution screen 901 may be displayed as 3, and the electronic device 101 may output music in volume 3. The user may input a left-to-right gesture 900, with the button 337 of the stylus pen 201 pressed. When the button 337 of the stylus pen 201 starts to be pressed, the stylus pen 201 may transmit communication signals including position information to the electronic device 101. The electronic device 101 may identify the gesture (e.g., the left-to-right swipe gesture) based on the position information included in the received communication signals. The electronic device 101 may turn the volume up one notch, which is an operation mapped to the left-to-right swipe gesture on the music play application. The electronic device 101 may turn the volume up one notch and display a second screen 902 showing that the current volume is level 4. The user may stop moving the stylus pen 201 and keep the button 337 pressed. The stylus pen 201 may continuously transmit information about the motion state to the electronic device 101. The electronic device 101 may identify that the stylus pen 201 has stopped moving, with the button 337 pressed and, based thereupon, repeat the operation corresponding to the gesture. Thus, the electronic device 101 may turn the volume up one notch and display a third screen 903 showing that the current volume is level 5. Although not shown, the electronic device 101 may sequentially and continuously turn the volume up. When the user releases the button 337, the stylus pen 201 may transmit a communication signal including information indicating that the button is released to the electronic device 101. The electronic device 101 may stop repeating the operation based on the identification of the button release.

Figure 9B:
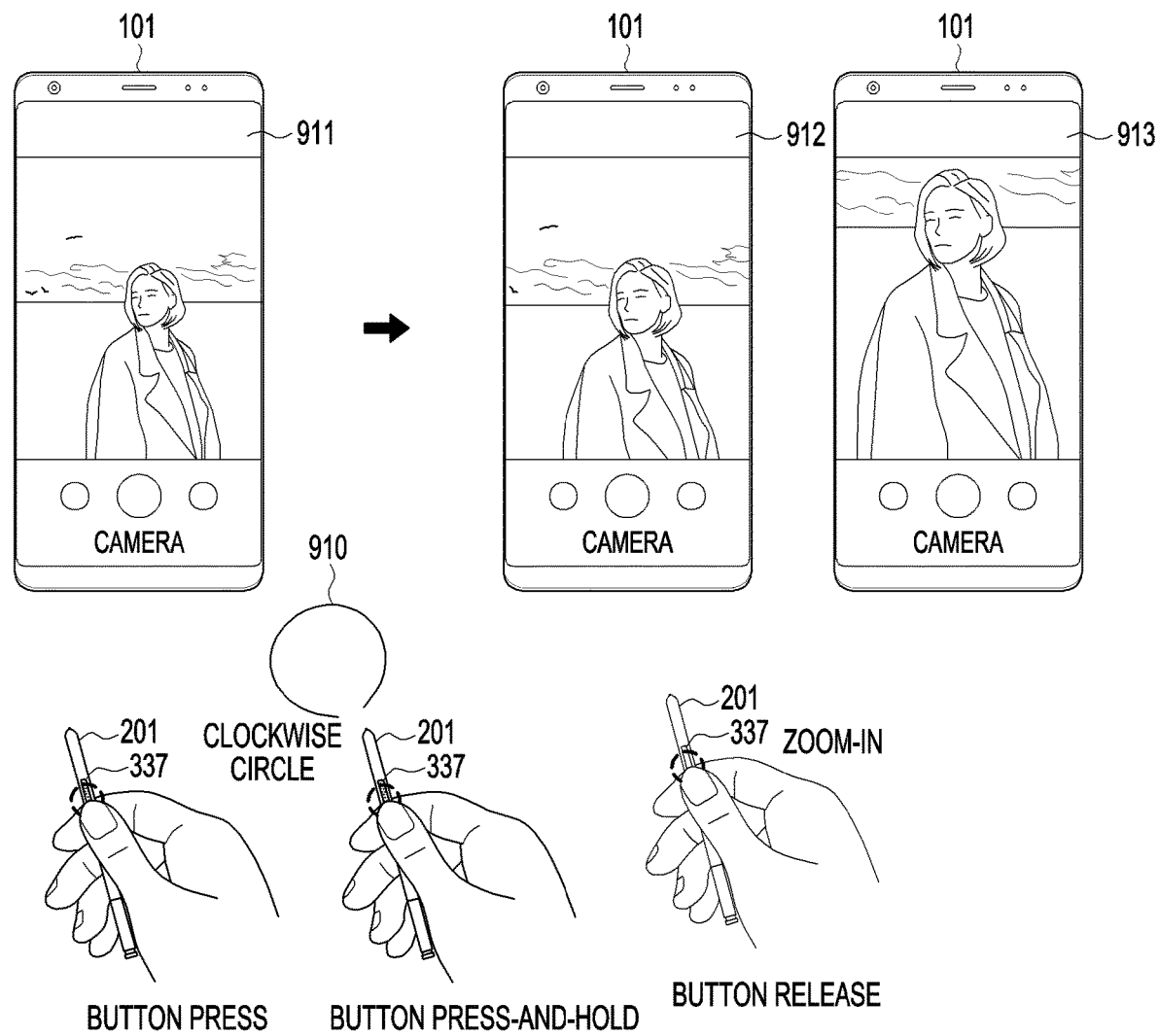
FIG. 9B is a diagram illustrating an example of repeating an execution of an operation according to an embodiment.

FIG. 9B is a diagram illustrating an example of repeating an execution of an operation according to an embodiment.

According to an embodiment, the electronic device 101 may execute a camera application and display a first execution screen 911 of the camera application. The first execution screen 911 may include, e.g., a preview image obtained by a camera and a visual element for controlling capturing and/or camera settings. The user may input a circle gesture 910 of circling clockwise, with the button 337 of the stylus pen 201 pressed. When the button 337 of the stylus pen 201 starts to be pressed, the stylus pen 201 may transmit communication signals including position information to the electronic device 101. The electronic device 101 may identify the gesture (e.g., the clockwise circle gesture) based on the position information included in the received communication signals. The electronic device 101 may perform a zoom-in operation that is mapped to the clockwise circle gesture and display a second screen 912 as a result of the zoom-in operation. The user may stop moving the stylus pen 201 and keep the button 337 pressed. The stylus pen 201 may continuously transmit information about the motion state to the electronic device 101. The electronic device 101 may identify that the stylus pen 201 has stopped moving, with the button 337 pressed and, based thereupon, repeat the operation corresponding to the gesture. Thus, the electronic device 101 may display a third screen 913 which is a result of the additional zoom-in operation. Although not shown, the electronic device 101 may sequentially and repeatedly perform the zoom-in operation. When the user releases the button 337, the stylus pen 201 may transmit a communication signal including information indicating that the button is released to the electronic device 101. The electronic device 101 may stop repeating the operation based on the identification of the button release.

Figure 9C:
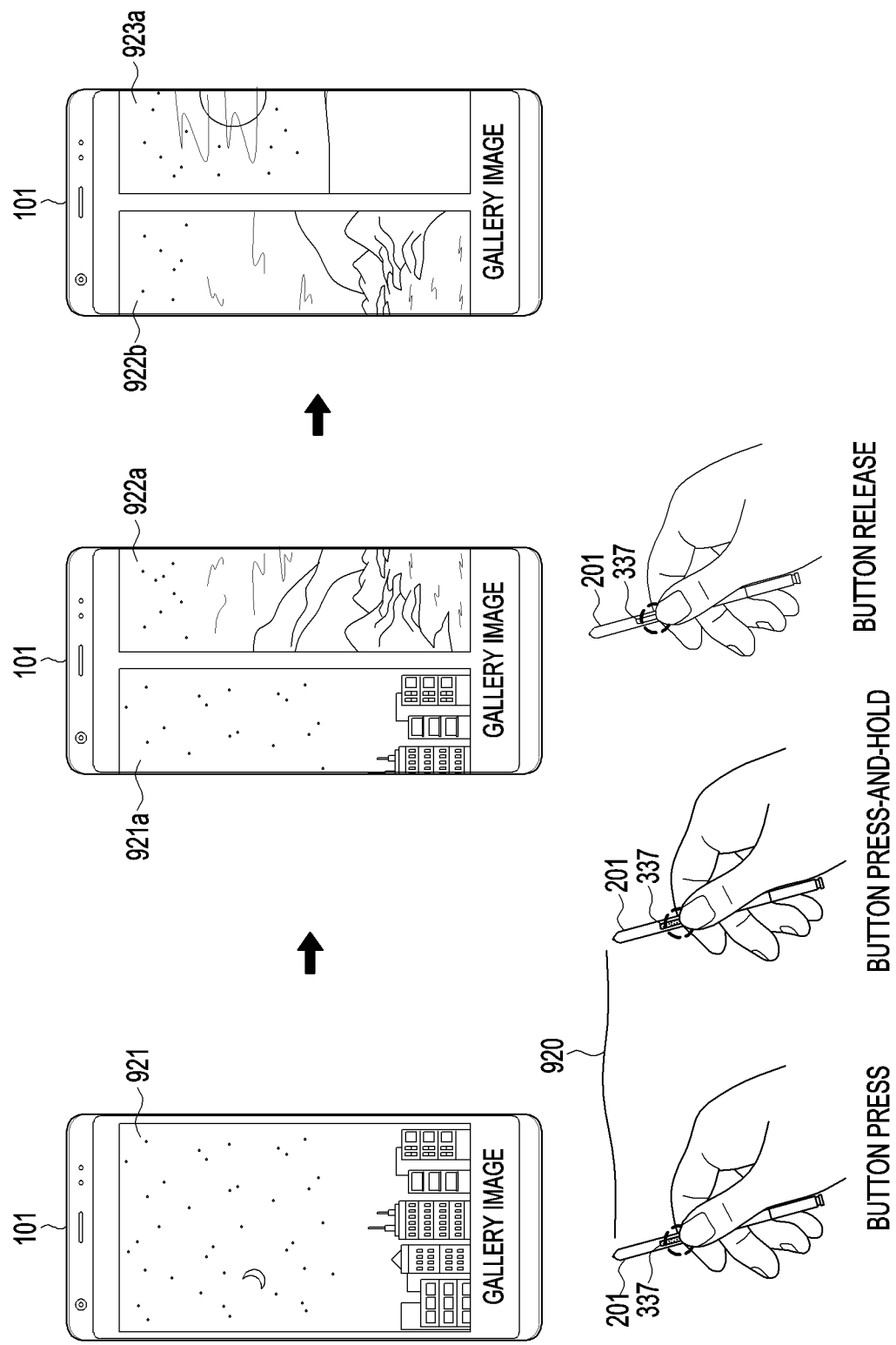
FIG. 9C is a diagram illustrating an example of repeating an execution of an operation according to an embodiment.

FIG. 9C is a diagram illustrating an example of repeating an execution of an operation according to an embodiment.

According to an embodiment, the electronic device 101 may execute a Gallery application and display a first execution screen 921 of the Gallery application. The first execution screen 921 may be, e.g., a first image stored on the Gallery application. The user may input a left-to-right swipe gesture 920, with the button 337 of the stylus pen 201 pressed. When the button 337 of the stylus pen 201 starts to be pressed, the stylus pen 201 may transmit communication signals including position information to the electronic device 101. The electronic device 101 may identify the gesture (e.g., the left-to-right swipe gesture) based on the position information included in the received communication signals. The electronic device 101 may perform an image switching operation that is mapped to the left-to-right swipe gesture on the Gallery application. Based on the image switching operation, the electronic device 101 may display both a portion 921a of the first image and a portion 922a of a second image next in order to the first image and, although not shown, may then display the whole second image. The user may stop moving the stylus pen 201 and keep the button 337 pressed. The stylus pen 201 may continuously transmit information about the motion state to the electronic device 101. The electronic device 101 may identify that the stylus pen 201 has stopped moving, with the button 337 pressed and, based thereupon, repeat the operation corresponding to the gesture. Thus, the electronic device 101 may perform an additional image switching operation. Thus, the electronic device 101 may display both a portion 922b of the second image and a portion 923a of a third image next in order to the second image and, although not shown, may then display the whole third image. Although not shown, the electronic device 101 may sequentially and repeatedly perform the image switching operation. When the user releases the button 337, the stylus pen 201 may transmit a communication signal including information indicating that the button is released to the electronic device 101. The electronic device 101 may stop repeating the operation based on the identification of the button release.

Figure 10:
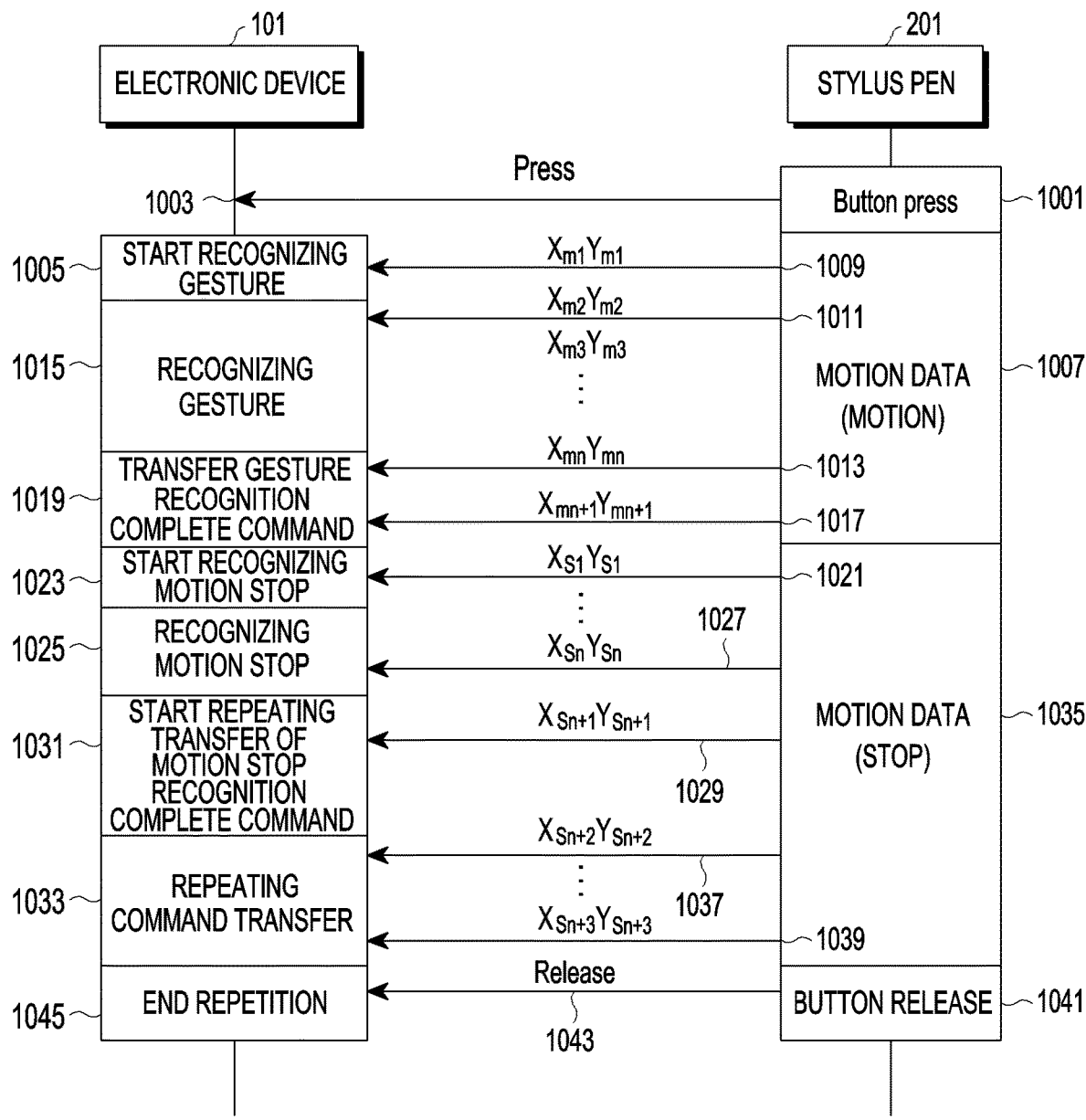
FIG. 10 is a diagram illustrating an example of transmission/reception of a communication signal between an electronic device and a stylus pen according to an embodiment.

FIG. 10 is a diagram illustrating an example of transmission/reception of a communication signal between an electronic device and a stylus pen according to an embodiment.

According to an embodiment, the stylus pen 201 may identify a button press in operation 1001. The stylus pen 201 may transmit a communication signal including information indicating the button press to the electronic device 101 in operation 1003. The electronic device 101 may start gesture recognition based on identifying the information indicating the button press in operation 1005. The stylus pen 201 may obtain motion data in operation 1007. Although FIG. 10 illustrates an example in which the stylus pen 201 obtains and transmits information about the displacement of the stylus pen 201 as the motion information, this is merely an example. For example, the stylus pen 201 may obtain information about the coordinates of the stylus pen 201 as the position information. The stylus pen 201 may identify the above-described coordinates or displacement using raw data from, e.g., a sensor (e.g., at least one of an accelerometer, gyro sensor, or geomagnetic sensor). The stylus pen 201 may directly transmit the raw data to the electronic device 101. For example, the stylus pen 201 may transmit a displacement of $(Xm_1, Ym_1)$ in operation 1009, a displacement of $(Xm_2, Ym_2)$ in operation 1011, a displacement of $(Xm_n, Ym_n)$ in operation 1013, and a displacement of $(Xm_{n+1}, Ym_{n+1})$ in operation 1017. In operation 1015, the electronic device 101 may be recognizing a gesture. For example, the electronic device 101 may input the coordinates identified by the displacements to determination algorithms (e.g., gesture detectors) individually corresponding to a plurality of gestures and may identify whether an algorithm indicating gesture detection is among the determination algorithms. In operation 1019, the electronic device 101 may complete gesture recognition and transfer a command for performing the operation mapped to the gesture to an application (e.g., a designated application or an application running in the foreground).

According to an embodiment, before the button is released, the stylus pen 201 may transmit the displacement of $(Xs_1, Ys_1)$ in operation 1021. Each component of the displacement of $(Xs_1, Ys_1)$ may be substantially 0. The electronic device 101 may identify that the size (e.g., the size of each component and/or the absolute value of the displacement vector) of the displacement $(Xs_1, Ys_1)$ is smaller than a threshold size and treat the size of the displacement of $(Xs_1, Ys_1)$ as 0 and identify this as a stopped state. In operation 1023, the electronic device 101 may start motion stop recognition after the gesture recognition is complete. In operation 1025, the electronic device 101 may be amid motion stop recognition. For example, the electronic device 101 may input the received coordinates or displacement to the algorithm for determining whether it stops and may monitor whether information indicating a stop is output. In operations 1027, 1029, 1037, and 1039, the stylus pen 201 may transmit the displacement of $(Xs_n, Ys_n)$, the displacement of $(Xs_{n+1}, Ys_{n+1})$, the displacement of $(Xs_{n+2}, Ys_{n+2})$, and the displacement of $(Xs_{n+3}, Ys_{n+3})$, respectively. The size of the displacement of $(Xs_n, Ys_n)$, the displacement of $(Xs_{n+1}, Ys_{n+1})$, the displacement of $(Xs_{n+2}, Ys_{n+2})$, and the displacement of $(Xs_{n+3}, Ys_{n+3})$ may be smaller than a threshold size and, thus, it may be treated as 0 by the electronic device 101. In operation 1031, the electronic device 101 may recognize the motion stop of the stylus pen 201 and start repeating the transfer of a command to the application. In operation 1033, the electronic device 101 may identify that the motion stop and button pressed state of the stylus pen 201 are maintained based on the received information and may repeat command transfer. In operation 1041, the stylus pen 201 may identify a button release and, in operation 1043, the stylus pen 201 may transmit a communication signal including information indicating the button release to the electronic device 101. In operation 1045, the electronic device 101 may terminate the repeated transfer of a command to the application.

Figure 11:
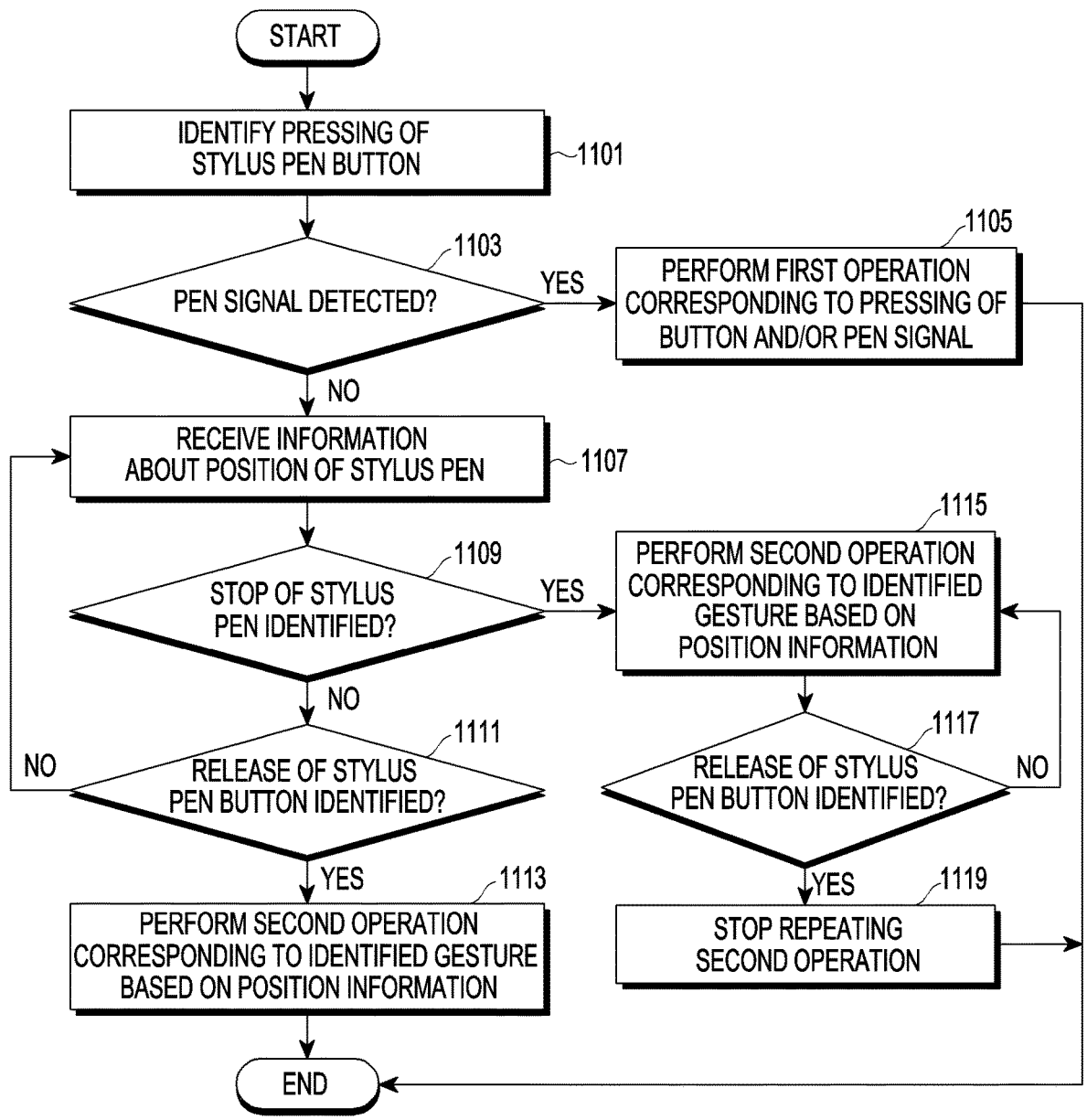
FIG. 11 is a flowchart illustrating an example method for operating an electronic device according to an embodiment.

FIG. 11 is a flowchart illustrating an example method for operating an electronic device according to an embodiment.

According to an embodiment, the electronic device 101 may identify a pressing of the button of the stylus pen 201 in operation 1101. In operation 1103, the electronic device 101 may identify whether a pen signal is detected. The electronic device 101 may identify whether a pen signal is detected based, for example, on whether an EMR signal or ECR signal is received or whether the capacitance of the panel is varied. Upon identifying that a pen signal is detected (yes in operation 1103), the electronic device 101 may perform a first operation corresponding to the pen signal and/or button press in operation 1105. For example, the electronic device 101 may perform an operation corresponding to the button press based on the position of the stylus pen 201 identified by the digitizer (or panel). When no pen signal is detected (no in operation 1103), the electronic device 101 may receive a communication signal including information about the position of the stylus pen 201 in operation 1107. In operation 1109, the electronic device 101 may identify whether the stylus pen 201 stops. When the displacement of the stylus pen 201 is less than a threshold displacement based on the position information about the stylus pen 201, the electronic device 101 may identify that the stylus pen 201 has stopped. When no stop of the stylus pen is identified (no in operation 1109), the electronic device 101 may identify whether the button of the stylus pen 201 is released in operation 1111. When no release of the button of the stylus pen 201 is identified (no in operation 1111), the electronic device 101 may again receive the position information about the stylus pen 201 in operation 1107. The electronic device 101 may identify whether the button is released based on the information included in the communication signal from the stylus pen 201. Upon identifying that the button of the stylus pen 201 is released (yes in operation 1111), the electronic device 101 may perform a second operation corresponding to the identified gesture based on the position information.

According to an embodiment, when the stylus pen is identified to stop (yes in operation 1109), the electronic device 101 may perform a second operation corresponding to the identified gesture based on the position information in operation 1115. In operation 1117, the electronic device 101 may identify whether the button of the stylus pen 201 is released. When no button release is identified (no in operation 1117), the electronic device 101 may repeat the second operation in operation 1115. For example, based on the stylus pen stopping and the button remaining pressed, when the button is identified to be released (yes in operation 1117), the electronic device 101 may stop repeating the second operation in operation 1119.

Figure 12A:
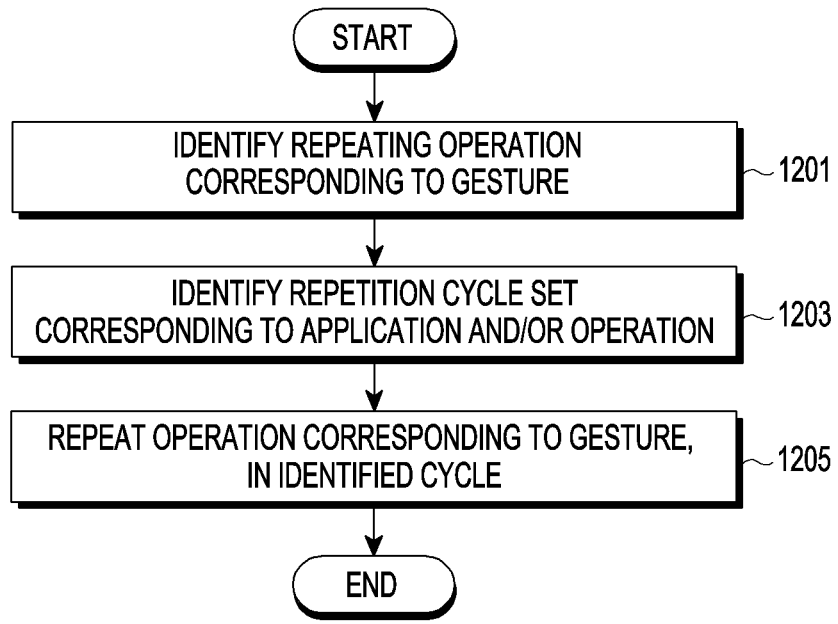
FIG. 12A is a flowchart illustrating an example method for operating an electronic device according to an embodiment.

FIG. 12A is a flowchart illustrating an example method for operating an electronic device according to an embodiment.

According to an embodiment, the electronic device 101 may identify repeating an operation corresponding to a gesture in operation 1201. For example, the electronic device 101 may identify repeating the operation corresponding to the gesture based on identifying that the stopped state is maintained, with the button of the stylus pen 201 remaining pressed. The electronic device 101 may transfer a command for the operation corresponding to the gesture to an application (e.g., a designated application or an application running in the foreground).

According to an embodiment, the electronic device 101 may identify a repetition cycle set corresponding to the operation and/or application in operation 1203. In operation 1205, the electronic device 101 may repeat the operation corresponding to the gesture in the identified repetition cycle. For example, the electronic device 101 may identify the repetition cycle set corresponding to the operation to be repeated. For example, the electronic device 101 may identify a repetition cycle set per application. The electronic device 101 may determine the repetition cycle based on a factor, as well as the operation and/or application. The kind of the factor is not limited to a specific one.

Figure 12B:
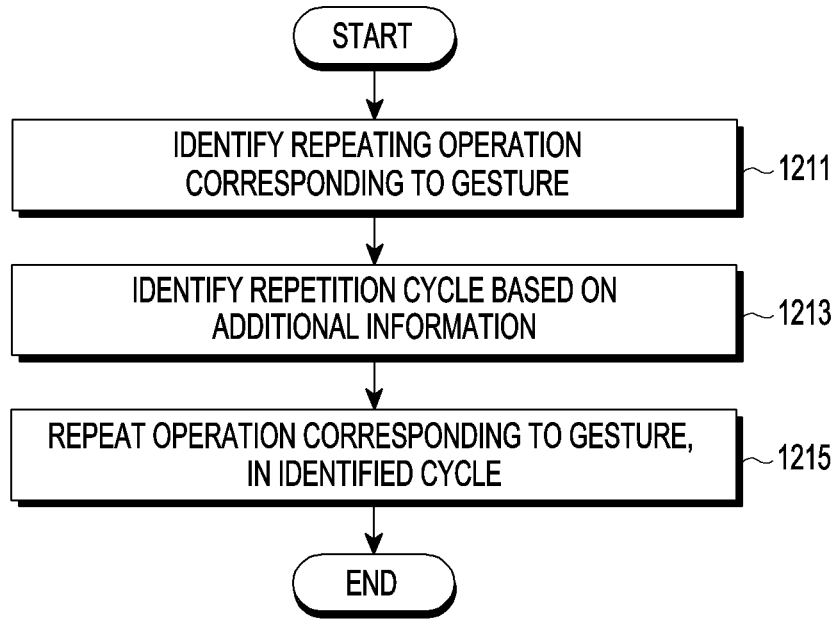
FIG. 12B is a flowchart illustrating an example method for operating an electronic device according to an embodiment.

FIG. 12B is a flowchart illustrating an example method for operating an electronic device according to an embodiment.

According to an embodiment, the electronic device 101 may identify repeating an operation corresponding to a gesture in operation 1211. According to an embodiment, the electronic device 101 may identify a repetition cycle based on additional information in operation 1213. For example, the electronic device 101 may identify the repetition cycle based on the input speed of the gesture. The electronic device 101 may identify the repetition cycle based on an additional user input (e.g., a voice input). The kind of the additional information is not limited to any specific type. In operation 1215, the electronic device 101 may repeat the operation corresponding to the gesture in the identified repetition cycle.

Figure 13:
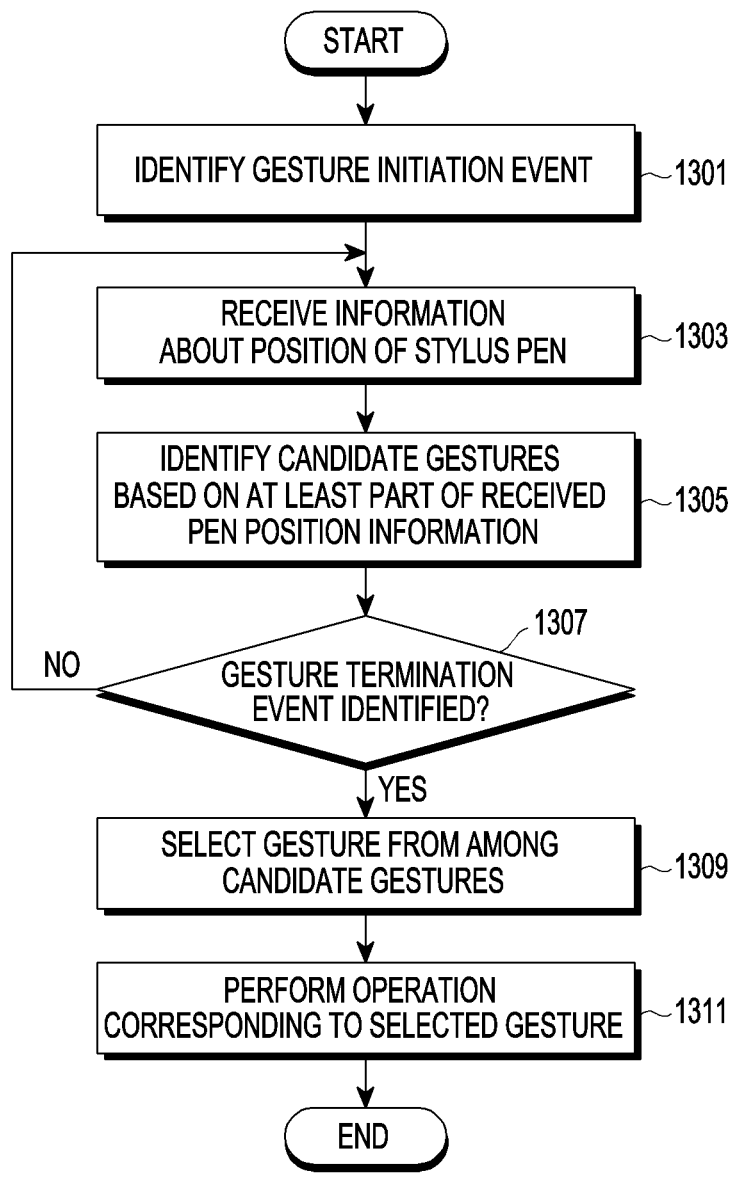
FIG. 13 is a flowchart illustrating an example method for operating an electronic device according to an embodiment.
Figure 14:
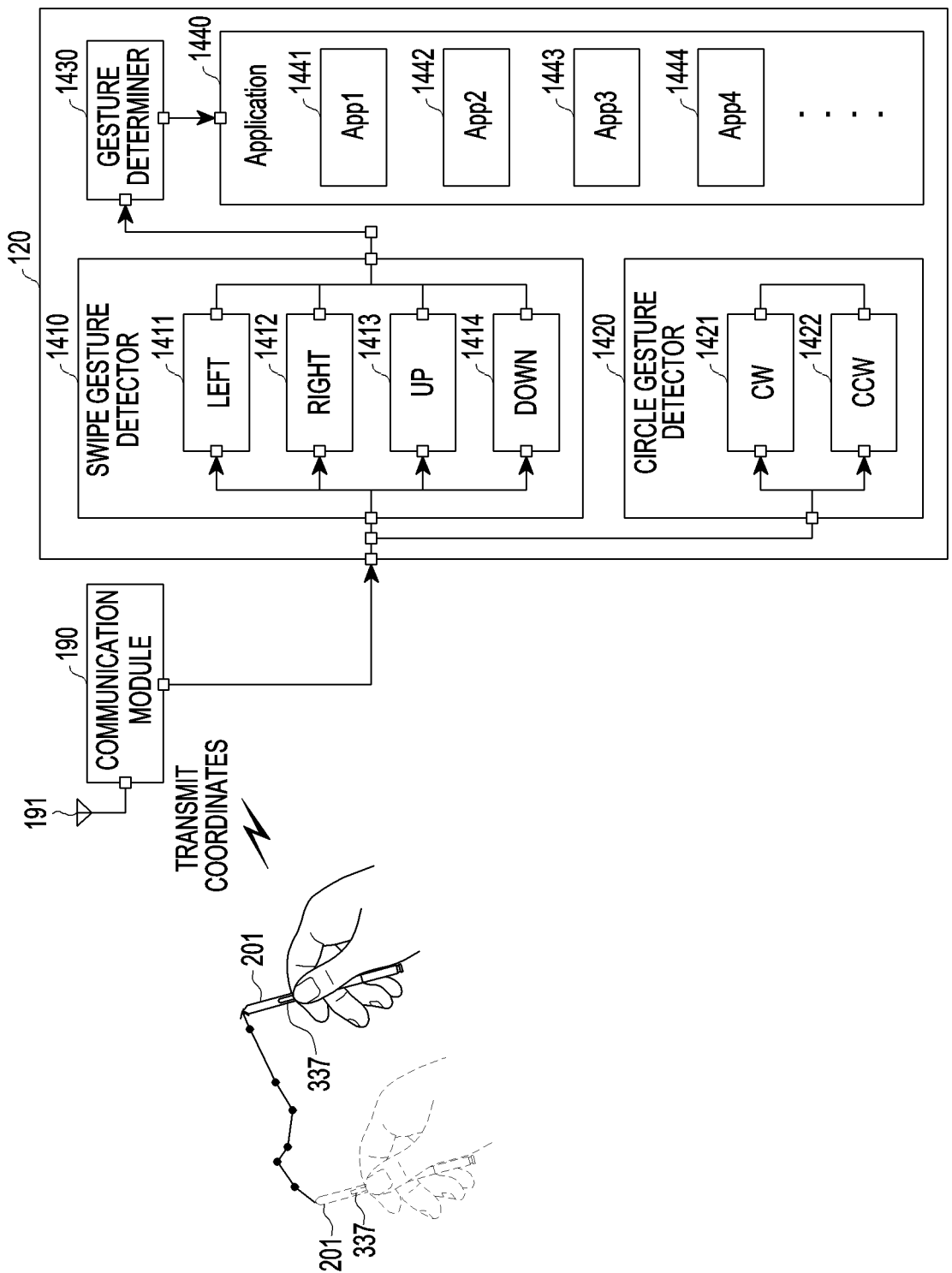
FIG. 14 is a diagram illustrating an example detector according to an embodiment.

FIG. 13 is a flowchart illustrating an example method for operating an electronic device according to an embodiment. The embodiment related to FIG. 13 is described with reference to FIG. 14. FIG. 14 is a diagram illustrating an example detector according to an embodiment.

According to an embodiment, the electronic device 101 may identify a gesture initiation event in operation 1301. In operation 1303, the electronic device 101 may receive information about the position of the stylus pen. In operation 1305, the electronic device 101 may identify a candidate gesture based on at least part of the received pen position information. For example, the electronic device 101 may receive the coordinates from the stylus pen 201 via an antenna 191 and communication module 190 as shown in FIG. 14. The electronic device 101 may provide the received coordinates to a swipe gesture detector 1410 and a circle gesture detector 1420. When the electronic device 101 receives raw data or displacement, the electronic device 101 may convert the same into coordinates and provide the coordinates to the detectors 1410 and 1420. Detectors may be a determination algorithm executed by, e.g., the processor 120 and may output a specific gesture based on the received coordinates. For example, the swipe gesture detector 1410 may output at least one of a swipe left gesture 1411, a swipe right gesture 1412, a swipe up gesture 1413, or a swipe down gesture 1414 as a candidate gesture based on the received coordinates. When there is no gesture meeting a condition, the swipe gesture detector 1410 may output no gesture. The circle gesture detector 1420 may output at least one of a clockwise gesture 1421 or counterclockwise gesture 1422 as a candidate gesture based on the received coordinates. When there is no gesture meeting a condition, the circle gesture detector 1420 may output no gesture. A detection algorithm for the swipe gesture detector 1410 and the circle gesture detector 1420 is described by way of example below. The swipe gesture detector 1410 and the circle gesture detector 1420 may be executed substantially simultaneously but, according to an implementation, they may be performed sequentially. Both the detectors 1410 and 1420 may be executed, or only the detector corresponding to gestures supported by the application running in the foreground may be executed. It will be appreciated by one of ordinary skill in the art that the kind and number of the detectors 1410 and 1420 are merely an example and are not limited thereto.

According to an embodiment, the electronic device 101 may identify whether a gesture termination event is detected in operation 1307. Before a gesture termination event is detected (no in operation 1307), the electronic device 101 may maintain the candidate gesture identification operation. For example, the electronic device 101 may provide new coordinates received to each of the detectors 1410 and 1420 while continuing to execute the detectors 1410 and 1420. When a termination event is detected (yes in operation 1307), the electronic device 101 may select a gesture from among candidate gestures in operation 1309. For example, the processor 120 may execute a gesture determiner 1430 as shown in FIG. 14. The gesture determiner 1430 may refer, for example, to an algorithm for selecting any one from among at least one candidate gesture. The electronic device 101 may perform an operation corresponding to the selected gesture in operation 1311. For example, the electronic device 101 may transfer the gesture or a command for performing a function mapped to the gesture to any one of applications 1441, 1442, 1443, and 1444 included in a set 1440 of loaded applications. A preset application or an application running in the foreground may be selected as an application to receive the gesture or the command for performing the function mapped to the gesture. A different function may be mapped to the gesture per application. Table 1 shows example mapping of per-application functions to gestures according to an embodiment.

TABLE 1

| application | swipe up/down gesture | swipe left/right gesture | clockwise/counter-clockwise gesture |
| --- | --- | --- | --- |
| camera application | before capture, switch front-facing camera and rear-facing camera | before capture, switch modes while capturing, N/A | capturing on rear-facing camera Zoom in/out |
| Gallery application | identify detail/detail view | identify previous/next photo | add/remove bookmark |
| note application | scroll up/down | switch mode tabs | convert/cancel handwritten text |
| internet application | scroll up/down | identify previous/next screen | renew |
| music application | not set | previous/next track | volume up/down |
| video application | not set | previous/next track | volume up/down |
| Office application | start presentation | turn page | run/end special function |

Referring to Table 1, the electronic device 101 may map a different function to the gesture for the state of (e.g., the state before or while capturing) one application (e.g., a camera application). For a specific application (e.g., a music application), no function may be mapped to a specific gesture (e.g., swipe up/down gesture).

Figure 15:
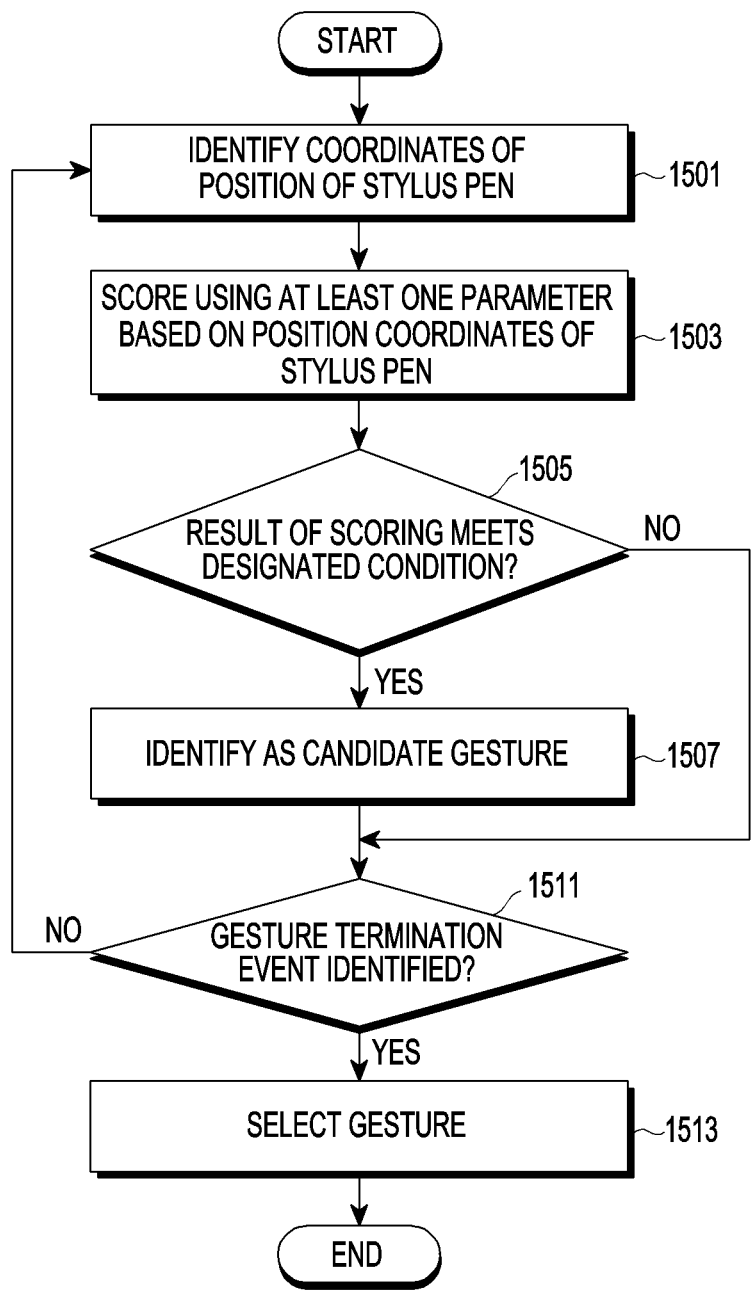
FIG. 15 is a flowchart illustrating an example method for operating an electronic device according to an embodiment.

FIG. 15 is a flowchart illustrating an example method for operating an electronic device according to an embodiment.

According to an embodiment, the electronic device 101 may identify the coordinates of the position of the stylus pen 201 in operation 1501. In operation 1503, the electronic device 101 may perform scoring using at least one parameter based on the coordinates of the position of the stylus pen 201. For example, the electronic device 101 may identify, as parameters, the direction of displacement between adjacent coordinates, the size of the displacement, the direction and size of any coordinates from the start point among all the coordinates and may perform scoring using the parameters. A different parameter and scoring scheme may be set per detector. In operation 1505, the electronic device 101 may identify whether the result of scoring meets a designated condition. When the designated condition is met (yes in operation 1505), the electronic device 101 may identify it as a candidate gesture in operation 1507. Unless the designated condition is met (no in operation 1505), the electronic device 101 may identify whether a gesture termination event is detected in operation 1511. For example, the electronic device 101 may identify a corresponding gesture and continue to perform computation on subsequent coordinates continuously entered. The electronic device 101 may store the identified gesture and update the stored gesture with another gesture based on the subsequent coordinates continuously entered. In other words, the electronic device 101 may perform scoring until the designated condition for the specific gesture fails to be met and, when the result of additional scoring fails to meet the designated condition, the electronic device 101 may determine that the gesture has not been detected. As described below, the electronic device 101 may manage the gesture as not applied (e.g., the non-applied state 1604 of FIG. 16). The electronic device 101 may identified that the previously updated gesture is a candidate gesture.

According to an embodiment, in operation 1511, the electronic device 101 may identify whether a gesture termination event is detected. When no gesture termination event is detected (no in operation 1511), the electronic device 101 may return to operation 1501 and identify the new coordinates of the stylus pen 201. The electronic device 101 may identify parameters for the new coordinates and perform scoring and, based on the result of scoring, the electronic device 101 may again determine whether to classify as a candidate gesture. When a gesture termination event is detected (yes in operation 1511), the electronic device 101 may select the candidate gesture as the gesture in operation 1513. As the coordinates are accumulated as described above, the specific gesture may be classified as a candidate gesture and be then managed as not detected by additional coordinates.

Figure 16:
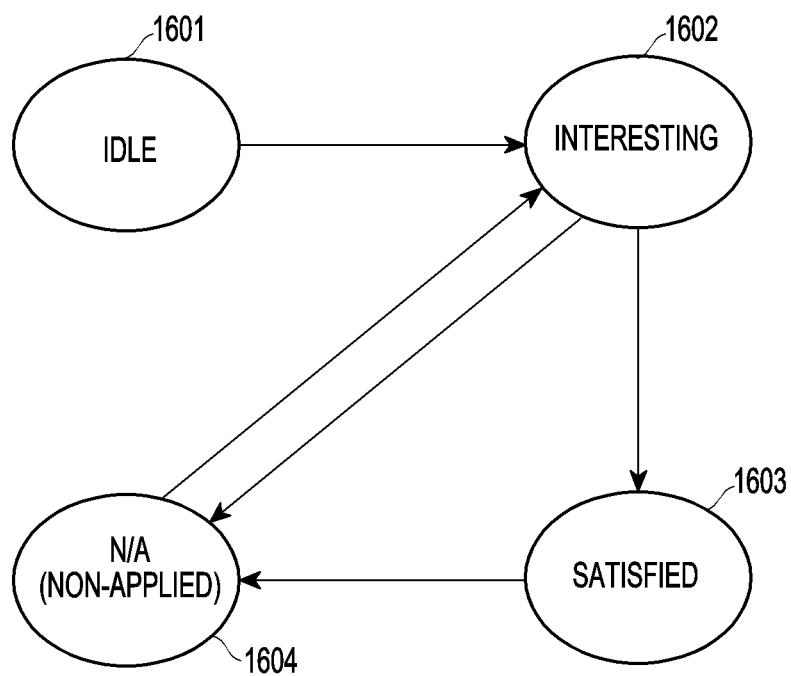
FIG. 16 is a state diagram illustrating a switch between states configured to determine candidate gestures according to an embodiment.

FIG. 16 is a state diagram illustrating an example switch between states configured to determine candidate gestures according to an embodiment.

According to an embodiment, the electronic device 101 may configure an idle state 1601, an interesting state 1602, a satisfied state 1603, and a non-applied (N/A) state 1604 corresponding to a specific gesture. The idle state 1601 may, for example, be a standby state to receive coordinates when a pairing with the stylus pen 201 is created. Upon receiving the coordinates of the position of the stylus pen 201, the electronic device 101 may enter the interesting state 1602. In the interesting state 1602, the electronic device 101 may, for example, perform scoring using parameters identified from the coordinates. When the result of scoring meets a designated condition, the electronic device 101 may identify a gesture corresponding to the satisfied state 1603 and keep on performing computation on subsequent coordinates continuously entered. In other words, the electronic device 101 may perform scoring until the designated condition fails to be met. Meanwhile, unless the result of scoring meets the designated condition in the interesting state 1602, the electronic device 101 may classify the gesture as the non-applied state 1604. Further, when the result of scoring is rendered to fail to meet the designated condition by additional coordinates in the satisfied state 1603, the electronic device 101 may store the last gesture meeting the scoring as a candidate gesture (last gesture) and classify the gesture as the non-applied state 1604. After entering the non-applied state 1604 and when coordinates are received again, the electronic device 101 may enter the interesting state 1602. The electronic device 101 may perform scoring using the parameter identified from the subsequent coordinates continuously entered and, when the designated condition is met, enter the satisfied state 1603 for the gesture. After entering the satisfied state 1603, the electronic device 101 may continuously perform scoring until the designated condition fails to be met and, when the condition fails to be met, store the last gesture meeting the scoring as a candidate gesture (ongoing gesture). In this case, the electronic device 101 may compare the lead distances of the stored gesture (last gesture) and the ongoing gesture and store the gesture with the longer lead distance as a candidate gesture. Comparison between the parameters of the ongoing gesture and the last gesture may be referred to as comparison between the parameters of candidate gestures.

According to an embodiment, the electronic device 101 may select any one of the detected candidate gestures upon detecting a termination event, rather than exchanging and storing, in real-time, the candidate gestures. For example, the electronic device 101 may identify at least one gesture detected until before a termination event (e.g., a button release) is detected and, upon detecting a termination event, the electronic device 101 may select any one of at least one gesture.

According to an example embodiment, an electronic device comprises: a communication module comprising communication circuitry, a processor electrically connected with the communication module, and a memory electrically connected with the processor. The memory may store instructions that, when executed by the processor, cause the processor to control the electronic device to: receive at least one first communication signal including information about a position of a stylus pen through the communication module, identify a gesture based on the information about the position of the stylus pen, identify an operation corresponding to the gesture, and based on detecting a repetition event for the operation based on at least one second communication signal received from the stylus pen through the communication module, repeat an execution of the operation.

According to an example embodiment, the instructions may, when executed by the processor, cause the processor to identify that information included in a communication signal received through the communication module before receiving the at least one first communication signal indicates a pressing of a button of the stylus pen, and based on identifying that the pressing of the button of the stylus pen, start gesture recognition using the at least one first communication signal.

According to an example embodiment, the instructions may, when executed by the processor, cause the processor to identify that the information about the position of the stylus pen included in the at least one second communication signal indicates a stop state of the stylus pen, and detect the stop state of the stylus pen as the repetition event for the operation.

According to an example embodiment, the instructions may, when executed by the processor, cause the processor to identify that the repetition event for the operation is detected based on identifying a holding of the pressing of the button of the stylus pen while identifying the stop state of the stylus pen.

According to an example embodiment, the instructions may, when executed by the processor, cause the processor to identify a releasing of the pressing of the button of the stylus pen based on a communication signal received through the communication module after receiving the at least one second communication signal, and stop repeating the execution of the operation based on identifying the releasing of the pressing of the button of the stylus pen.

According to an example embodiment, the instructions may, when executed by the processor, cause the processor to identify a repetition cycle of the execution of the operation based on at least one of the gesture or an application for the execution of the operation corresponding to the gesture, and repeat the execution of the operation according to the repetition cycle.

According to an example embodiment, the instructions may, when executed by the processor, cause the processor to identify a repetition cycle of the execution of the operation based on identified additional information, and repeat the execution of the operation according to the repetition cycle.

According to an example embodiment, the information about the position of the stylus pen may include at least one of sensing data obtained by a sensor of the stylus pen, coordinates of the stylus pen identified based on the sensing data, or a displacement of the stylus pen identified based on the sensing data.

According to an example embodiment, the instructions may, when executed by the processor, cause the processor to repeat, as the execution of the operation, an execution of a function mapped to the gesture of an application running in a foreground of the electronic device.

According to an example embodiment, an electronic device comprises: a panel (e.g., the sensing panel 503), a communication module comprising communication circuitry, a processor electrically connected with the panel and the communication module, and a memory electrically connected with the processor. The memory may store instructions that, when executed by the processor, cause the processor to control the electronic device to: based on a pen signal from a stylus pen through the panel being detected, execute a first operation based on the pen signal, and based on the pen signal from the stylus pen through the panel not being detected, identify a gesture using information about a position of the stylus pen included in at least one first communication signal received through the communication module, identify a second operation corresponding to the gesture, and based on detecting a repetition event for the second operation, repeat an execution of the second operation.

According to an example embodiment, the instructions may, when executed by the processor, cause the processor to identify that information included in a communication signal received through the communication module before receiving the at least one first communication signal indicates a pressing of a button of the stylus pen, and based on identifying that the pressing of the button of the stylus pen, start gesture recognition using the at least one first communication signal.

According to an example embodiment, the instructions may, when executed by the processor 120 cause the processor to identify that the information about the position of the stylus pen included in at least one second communication signal received via the communication module indicates a stop state of the stylus pen, and detect the stop state of the stylus pen as the repetition event for the second operation.

According to an example embodiment, the instructions may, when executed by the processor, cause the processor to identify that the repetition event for the second operation is detected based on identifying a holding of the pressing of the button of the stylus pen while identifying the stop state of the stylus pen.

According to an example embodiment, the instructions may, when executed by the processor, cause the processor to identify a releasing of the pressing of the button of the stylus pen based on a communication signal received through the communication module after receiving the at least one second communication signal, and stop repeating the execution of the second operation based on identifying the releasing of the pressing of the button of the stylus pen.

According to an example embodiment, the instructions may, when executed by the processor, cause the processor to identify a repetition cycle of the execution of the second operation based on at least one of the gesture or an application for the execution of the second operation corresponding to the second gesture, and repeat the execution of the second operation in the repetition cycle.

According to an example embodiment, the instructions may, when executed by the processor, cause the processor to identify a repetition cycle of the operation based on identified additional information, and repeat the execution of the operation according to the repetition cycle.

According to an example embodiment, the information about the position of the stylus pen may include at least one of sensing data obtained by at least one sensor of the stylus pen, coordinates of the stylus pen identified based on the sensing data, or a displacement of the stylus pen identified based on the sensing data.

According to an example embodiment, the instructions may, when executed by the processor, cause the processor to repeat, as the execution of the second operation, an execution of a function mapped to the gesture of an application running in a foreground of the electronic device.

According to an example embodiment, a method of operating an electronic device comprises: receiving at least one first communication signal including information about a position of a stylus pen, identifying a gesture based on the information about the position of the stylus pen, identifying an operation corresponding to the gesture, and based on detecting a repetition event for the operation based on at least one second communication signal received from the stylus pen, repeating an execution of the operation.

According to an example embodiment, the information about the position of the stylus pen may include at least one of sensing data obtained by at least one sensor of the stylus pen, coordinates of the stylus pen identified based on the sensing data, or a displacement of the stylus pen identified based on the sensing data.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device that may identify a gesture with a stylus pen, based on information included in a communication signal received from the stylus pen and repeat an operation corresponding to the identified gesture and a method for operating the electronic device.

While the disclosure has been illustrated and described with reference to various embodiments thereof, it will be understood that the various example embodiments are intended to be illustrative, not limiting. It will be understood by those skilled in the art that various changes in form and details may be made without departing from the true spirit and full scope of the disclosure including the appended claims and their equivalents.

What is claimed is:

1. An electronic device, comprising:
    a communication module comprising communication circuitry;
    a processor electrically connected with the communication module; and
    a memory electrically connected with the processor, wherein the memory stores instructions configured to, when executed by the processor, cause the processor to control the electronic device to:
    receive at least one first communication signal including information about a position of a stylus pen through the communication module,
    identify a gesture based on the information about the position of the stylus pen,
    identify an operation corresponding to the gesture,
    based on at least one second communication signal received from the stylus pen through the communication module, identify that the position of the stylus pen is a stop state while a button of the stylus pen is pressed,
    based on identifying that the position of the stylus pen is the stop state while the button of the stylus pen is pressed, detect a repeat event for the identified operation, and
    based on detecting the repeat event for the identified operation, repeat an execution of the identified operation.

2. The electronic device of claim 1, wherein the instructions, when executed by the processor, cause the processor to:
    identify that information included in a communication signal received through the communication module before receiving the at least one first communication signal indicates a pressing of the button of the stylus pen, and
    based on identifying the pressing of the button of the stylus pen, start gesture recognition using the at least one first communication signal.

3. The electronic device of claim 1, wherein the instructions, when executed by the processor, cause the processor to:
    identify a releasing of a pressing of the button of the stylus pen based on a communication signal received through the communication module after receiving the at least one second communication signal, and
    based on identifying the releasing of the pressing of the button of the stylus pen, stop repeating the execution of the identified operation.

4. The electronic device of claim 1, wherein the instructions, when executed by the processor, cause the processor to:
    identify a repetition cycle of the execution of the identified operation based on at least one of the identified gesture or an application for the execution of the identified operation corresponding to the identified gesture, and
    repeat the execution of the identified operation based on the repetition cycle.

5. The electronic device of claim 1, wherein the instructions, when executed by the processor, cause the processor to:
    identify a repetition cycle of the execution of the identified operation based on identified additional information, and
    repeat the execution of the identified operation based on the repetition cycle.

6. The electronic device of claim 1, wherein the information about the position of the stylus pen includes at least one of sensing data obtained by a sensor of the stylus pen, coordinates of the stylus pen identified based on the sensing data, or a displacement of the stylus pen identified based on the sensing data.

7. The electronic device of claim 1, wherein the instructions, when executed by the processor, cause the processor to repeat, as the execution of the identified operation, an execution of a function mapped to the gesture of an application running in a foreground of the electronic device.

8. An electronic device, comprising:
    a panel;
    a communication module comprising communication circuitry;
    a processor electrically connected with the panel and the communication module; and
    a memory electrically connected with the processor, wherein the memory stores instructions configured to, when executed by the processor, cause the processor to:
    based on a pen signal from a stylus pen being detected through the panel, execute a first operation based on the pen signal, and
    based on the pen signal from the stylus pen not being detected through the panel:
        based on information about a position of the stylus pen included in at least one first communication signal received from the stylus pen through the communication module, identify a gesture,
        identify a second operation corresponding to the identified gesture,
        based on at least one second communication signal received from the stylus pen through the communication module, identify that the position of the stylus pen is a stop state while a button of the stylus pen is pressed, based on identifying that the position of the stylus pen is the stop state while the button is pressed, detect a repetition event for the identified second operation, and based on detecting the repetition event for the identified second operation, repeat an execution of the identified second operation.

9. The electronic device of claim 8, wherein the instructions, when executed by the processor, cause the processor to:

identify that information included in a communication signal received through the communication module before receiving the at least one first communication signal indicates a pressing of the button of the stylus pen, and based on identifying that the pressing of the button of the stylus pen, start gesture recognition using the at least one first communication signal.

10. The electronic device of claim 8, wherein the instructions, when executed by the processor, cause the processor to:

identify a releasing of a pressing of the button of the stylus pen based on a communication signal received through the communication module after receiving the at least one second communication signal, and stop repeating the execution of the identified second operation based on identifying the releasing of the pressing of the button of the stylus pen.

11. The electronic device of claim 8, wherein the instructions, when executed by the processor, cause the processor to:

identify a repetition cycle of the execution of the identified second operation based on at least one of the identified gesture or an application for the execution of the identified second operation corresponding to the identified gesture, and repeat the execution of the identified second operation based on the repetition cycle.

12. The electronic device of claim 8, wherein the instructions, when executed by the processor, cause the processor to:

identify a repetition cycle of the execution of the identified second operation based on identified additional information, and repeat the execution of the identified second operation based on the repetition cycle.

13. The electronic device of claim 8, wherein the information about the position of the stylus pen includes at least one of sensing data obtained by at least one sensor of the stylus pen, coordinates of the stylus pen identified based on the sensing data, or a displacement of the stylus pen identified based on the sensing data.

14. The electronic device of claim 8, wherein the instructions, when executed by the processor, cause the processor to repeat, as the execution of the identified second operation, an execution of a function mapped to the gesture of an application running in a foreground of the electronic device.

15. A method of operating an electronic device, the method comprising:

receiving at least one first communication signal including information about a position of a stylus pen;

identifying a gesture based on the information about the position of the stylus pen;

identifying an operation corresponding to the gesture;

based on at least one second communication signal received from the stylus pen, identifying that the position of the stylus pen is a stop state while a button of the stylus pen is pressed, based on identifying that the position of the stylus pen is a stop state while the button of the stylus pen is pressed, detecting a repeat event for the identified operation; and based on detecting the repeat event for the identified operation, repeating an execution of the identified operation.

16. The method of claim 15, wherein the information about the position of the stylus pen includes at least one of sensing data obtained by at least one sensor of the stylus pen, coordinates of the stylus pen identified based on the sensing data, or a displacement of the stylus pen identified based on the sensing data.

* * * * *